US010091771B2

United States Patent
Seok

(10) Patent No.: US 10,091,771 B2
(45) Date of Patent: Oct. 2, 2018

(54) SOUNDING PROCEDURE INCLUDING UPLINK MULTIPLE-USER TRANSMISSION IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/900,315

(22) Filed: Feb. 20, 2018

(65) Prior Publication Data
US 2018/0184421 A1    Jun. 28, 2018

Related U.S. Application Data

(63) Continuation of application No. 14/944,180, filed on Nov. 17, 2015, now Pat. No. 9,936,488.
(Continued)

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0009* (2013.01); *H04L 1/0025* (2013.01);
(Continued)

(58) Field of Classification Search
CPC ........... H04W 72/0413; H04W 72/046; H04W 84/12; H04L 1/0025; H04L 1/0625
See application file for complete search history.

(56) References Cited

U.S. PATENT DOCUMENTS

2011/0310827 A1* 12/2011 Srinivasa ............. H04B 7/0434
                                                      370/329
2012/0033592 A1*  2/2012 Kim .................... H04B 7/0452
                                                      370/310
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Duc C Ho
(74) *Attorney, Agent, or Firm* — McDermott Will & Emery LLP

(57) ABSTRACT

The present disclosure relates to a sounding procedure including uplink multi-user transmission in a High Efficiency WLAN (HEW). According to one aspect of the present disclosure, a method for transmitting a response frame by a responding Station (STA) to a transmitting STA in a wireless local area network may be provided. The method may include receiving, from the transmitting STA, a trigger frame including information related to a Modulation and Coding Scheme (MCS) for the response frame, and transmitting, to the transmitting STA, the response frame according to an MCS determined based on the information related to the MCS for the response frame included in the trigger frame. When a type of the response frame corresponds to a Multiple-User (MU) type, a same MCS may be applied to the response frame by a plurality of STAs including the STA and at least one other STA.

20 Claims, 28 Drawing Sheets

Related U.S. Application Data

(60) Provisional application No. 62/170,072, filed on Jun. 2, 2015, provisional application No. 62/081,484, filed on Nov. 18, 2014.

(51) Int. Cl.
*H04L 1/06* (2006.01)
*H04W 84/12* (2009.01)

(52) U.S. Cl.
CPC ......... *H04W 72/046* (2013.01); *H04L 1/0625* (2013.01); *H04W 84/12* (2013.01)

(56) References Cited

U.S. PATENT DOCUMENTS

| | | | |
|---|---|---|---|
| 2012/0269183 A1 | 10/2012 | Sohn et al. | |
| 2012/0281620 A1* | 11/2012 | Sampath | H04B 7/0643 370/328 |
| 2013/0010844 A1 | 1/2013 | Amini et al. | |
| 2013/0329620 A1 | 12/2013 | Kim et al. | |
| 2015/0063318 A1 | 3/2015 | Merlin et al. | |
| 2015/0295629 A1* | 10/2015 | Xia | H04B 7/0491 370/329 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-SIG-C | PSDU(AP to STA1,STA2) |

FIG. 15

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 to AP) |
| | | | | HE-STF | HE-LTF | HE-SIG-B | HE-LTF | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-LTF | HE-SIG-C | PSDU(STA1 to AP) |

FIG. 16

| L-STF | L-LTF | L-SIG | HE-SIG-A | HE-STF | HE-LTF | HE-SIG-B | HE-LTF | HE-LTF | HE-LTF | HE-SIG-C | PSDU (AP to STA4) with Beam-forming |
| | | | | HE-STF | HE-LTF | HE-SIG-B | HE-LTF | HE-LTF | HE-LTF | HE-SIG-C | PSDU (AP to STA3) with Beam-forming |
| | | | | HE-STF | HE-LTF | HE-SIG-B | HE-LTF | HE-LTF | HE-LTF | HE-SIG-C | PSDU (AP to STA2) with Beam-forming |
| | | | | HE-STF | HE-LTF | HE-SIG-B | HE-LTF | HE-LTF | HE-LTF | HE-SIG-C | PSDU (AP to STA1) with Beam-forming |

⇨ Beamformed Status Information of each subchannel

FIG. 17

| L-STF | L-LTF | L-SIG | HE-SIG-A | HE-STF | HE-LTF | HE-LTF | HE-LTF | HE-LTF | HE-SIG-B | HE-LTF | HE-LTF | HE-LTF | HE-LTF | HE-SIG-C | PSDU (AP to STA4) without Beam-forming |
| | | | | HE-STF | HE-LTF | HE-LTF | HE-LTF | HE-LTF | HE-SIG-B | HE-LTF | HE-LTF | HE-LTF | HE-LTF | HE-SIG-C | PSDU (AP to STA3) without Beam-forming |
| | | | | HE-STF | HE-LTF | HE-LTF | HE-LTF | HE-LTF | HE-SIG-B | HE-LTF | HE-LTF | HE-LTF | HE-LTF | HE-SIG-C | PSDU (AP to STA2) with Beam-forming |
| | | | | HE-STF | HE-LTF | HE-LTF | HE-LTF | HE-LTF | HE-SIG-B | HE-LTF | HE-LTF | HE-LTF | HE-LTF | HE-SIG-C | PSDU (AP to STA1) with Beam-forming |

⇨ Beamformed Status Information of each subchannel

SOUNDING PROCEDURE INCLUDING UPLINK MULTIPLE-USER TRANSMISSION IN A HIGH EFFICIENCY WIRELESS LAN

CROSS-REFERENCE TO RELATED APPLICATIONS

The present application claims the benefit of priority under 35 U.S.C. § 120 as a continuation of U.S. application Ser. No. 14/944,180, entitled "SOUNDING PROCEDURE INCLUDING UPLINK MULTIPLE-USER TRANSMISSION IN A HIGH EFFICIENCY WIRELESS LAN," filed on Nov. 17, 2015, which claims the benefit of priority under 35 U.S.C. § 119 from U.S. Provisional Application No. 62/170,072, entitled "NDP SOUNDING IN IEEE 802.11AX," filed on Jun. 2, 2015, and U.S. Provisional Application No. 62/081,484, entitled "ENHANCED MU-MIMO SOUNDING PROCEDURE," filed on Nov. 18, 2014, the entirety of each of which is incorporated herein by reference.

BACKGROUND

Technical Field

The present disclosure relates to a Wireless Local Area Network (WLAN), and more particularly, to a method, apparatus, and software for performing a sounding procedure including uplink multi-user transmission in a High Efficiency WLAN (HEW), and a recording medium that stores the software.

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for performing a sounding procedure including uplink multi-user transmission in a HEW.

SUMMARY

Objects of the present disclosure is to provide a method and apparatus for performing a sounding procedure including uplink multi-user transmission in a High Efficiency WLAN (Wireless Local Area Network) (HEW).

The objects of the present disclosure are not limited to the foregoing descriptions, and additional objects will become apparent to those having ordinary skill in the pertinent art to the present disclosure based upon the following descriptions.

In an aspect of the present disclosure, a method for transmitting a response frame by a responding Station (STA) to a transmitting STA in a wireless local area network may be provided. The method may include receiving, from the transmitting STA, a trigger frame including information related to a Modulation and Coding Scheme (MCS) for the response frame, and transmitting, to the transmitting STA, the response frame according to an MCS determined based on the information related to the MCS for the response frame included in the trigger frame. When a type of the response frame corresponds to a Multiple-User (MU) type, a same MCS may be applied to the response frame by a plurality of STAs including the STA and at least one other STA.

In another aspect of the present disclosure, a method for receiving a response frame by a transmitting STA from a responding STA in a wireless local area network may be provided. The method may include transmitting, to the responding STA, a trigger frame including information related to an MCS for the response frame, and receiving, from the responding STA, the response frame according to an MCS determined based on the information related to the MCS for the response frame included in the trigger frame. When a type of the response frame corresponds to an MU type, a same MCS may be applied to the response frame by a plurality of STAs including the STA and at least one other STA.

In another aspect of the present disclosure, a responding STA apparatus for transmitting a response frame to a transmitting STA in a wireless local area network may be provided. The responding STA apparatus may include a baseband processor, a Radio Frequency (RF) transceiver, a memory, etc. The baseband processor may be configured to receive, from the transmitting STA, a trigger frame including information related to an MCS for the response frame using the transceiver, and to transmit, to the transmitting STA, the response frame using the transceiver according to an MCS determined based on the information related to the MCS for the response frame included in the trigger frame. When a type of the response frame corresponds to an MU type, a same MCS may be applied to the response frame by a plurality of STAs including the STA and at least one other STA.

In another aspect of the present disclosure, a responding STA apparatus for receiving a response frame by a transmitting STA in a wireless local area network may be provided. The responding STA apparatus may include a baseband processor, an RF transceiver, a memory, etc. The baseband processor may be configured to transmit, to the responding STA, a trigger frame including information related to an MCS for the response frame using the transceiver, and to receive, from the responding STA, the response frame using the transceiver according to an MCS determined based on the information related to the MCS for the response frame included in the trigger frame. When a type of the response frame corresponds to an MU type, a same MCS may be applied to the response frame by a plurality of STAs including the STA and at least one other STA.

In another aspect of the present disclosure, a software or computer-readable medium having instructions executable for a responding STA to transmit a response frame to a transmitting STA in a wireless local area network may be provided. The executable instructions may cause the responding STA to receive, from the transmitting STA, a trigger frame including information related to an MCS for the response frame, and to transmit, to the transmitting STA, the response frame according to an MCS determined based on the information related to the MCS for the response frame included in the trigger frame. When a type of the response frame corresponds to an MU type, a same MCS may be applied to the response frame by a plurality of STAs including the STA and at least one other STA.

In another aspect of the present disclosure, a software or computer-readable medium having instructions executable for a responding STA to receive a response frame by a transmitting STA in a wireless local area network may be provided. The executable instructions may cause the responding STA to transmit, to the responding STA, a trigger frame including information related to an MCS for the response frame, and to receive, from the responding STA, the response frame according to an MCS determined based on the information related to the MCS for the response frame included in the trigger frame. When a type of the response frame corresponds to an MU type, a same MCS may be applied to the response frame by a plurality of STAs including the STA and at least one other STA.

It is to be understood that both the foregoing summarized features are exemplary aspects of the following detailed description of the present disclosure without limiting the scope of the present disclosure.

According to the present disclosure, a method and apparatus for performing a sounding procedure including uplink multi-user transmission in a High Efficiency WLAN (Wireless Local Area Network) (HEW) can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of an High Efficiency Long Training Field (HE-LTF) field in a HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 15 depicts another exemplary HE PPDU frame format according to the present disclosure;

FIGS. 16 and 17 depict exemplary HE PPDU frame formats supporting beamforming according to the present disclosure;

DETAILED DESCRIPTION

Figure 1:
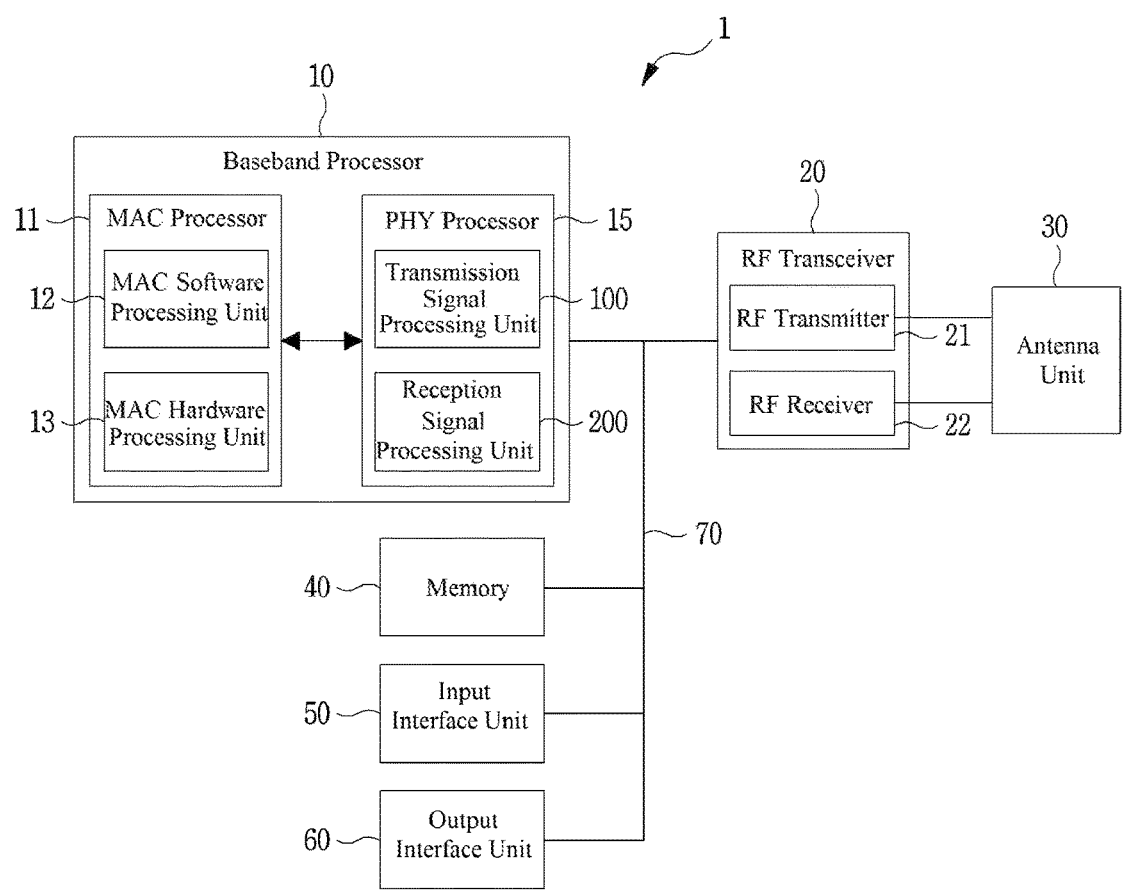
FIG. 1 is a block diagram of a Wireless Local Area Network (WLAN) device.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
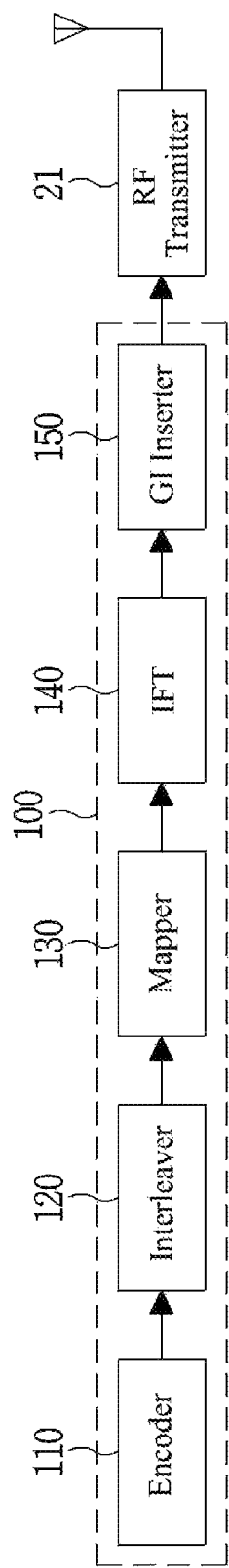
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
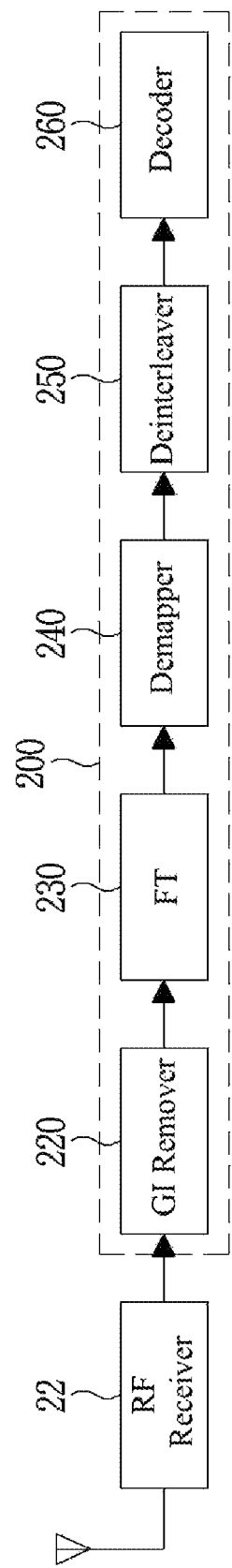
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
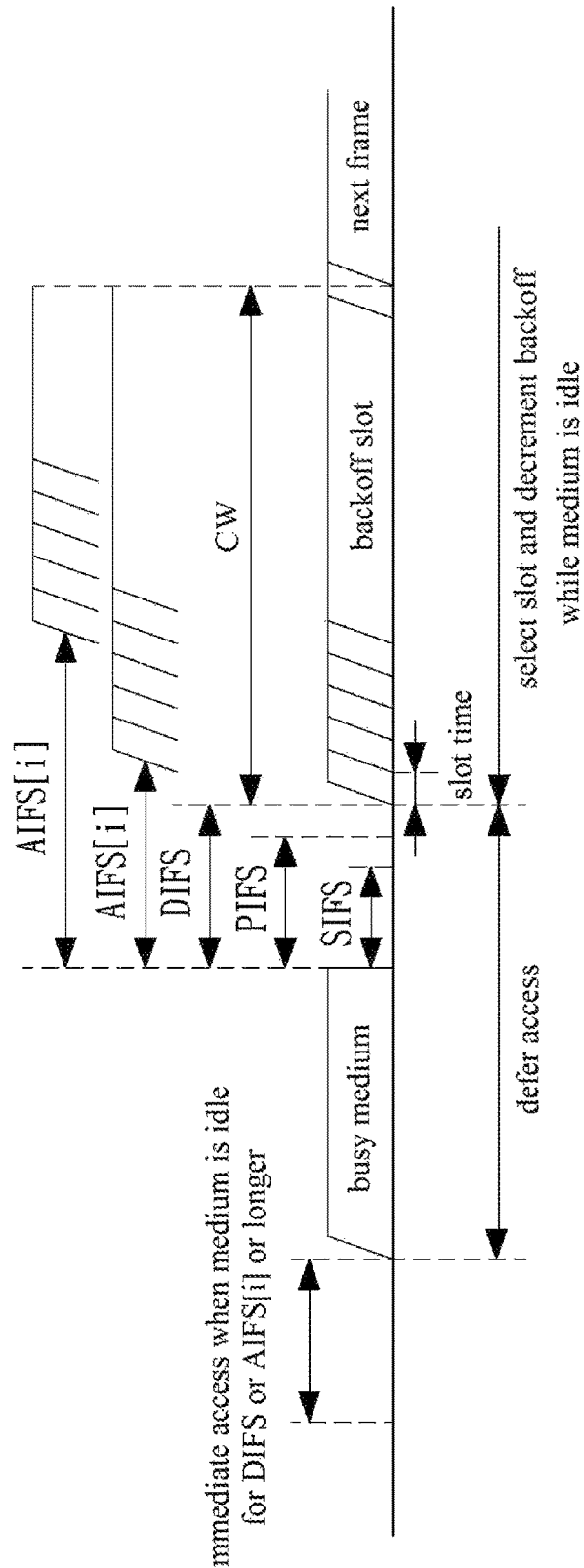
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
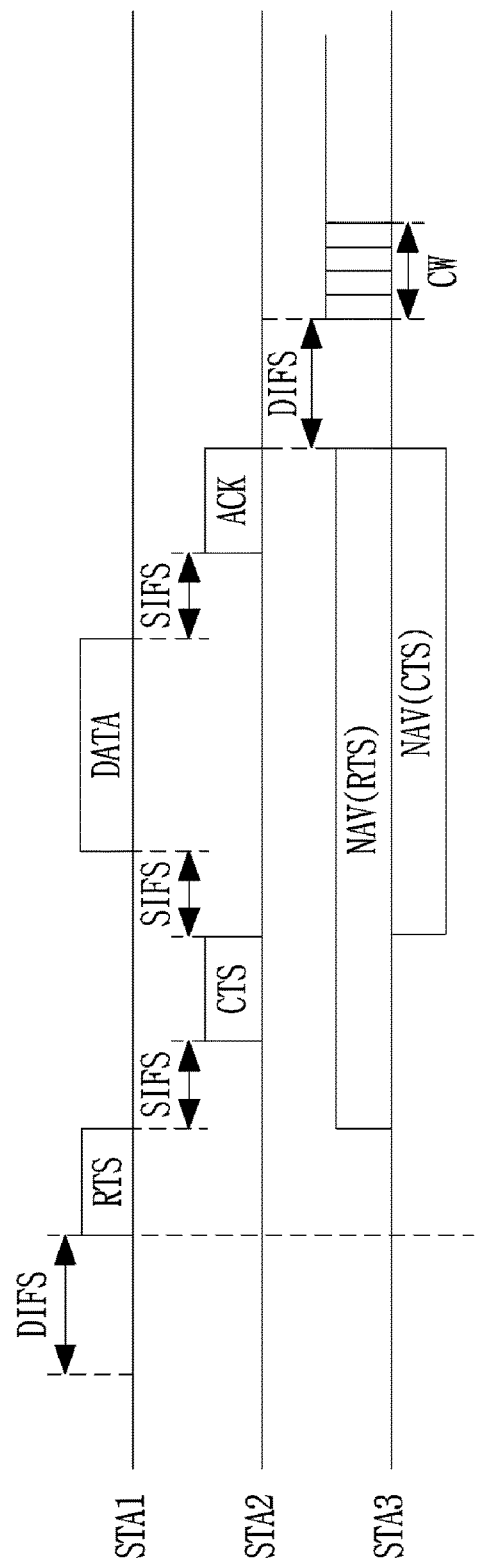
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
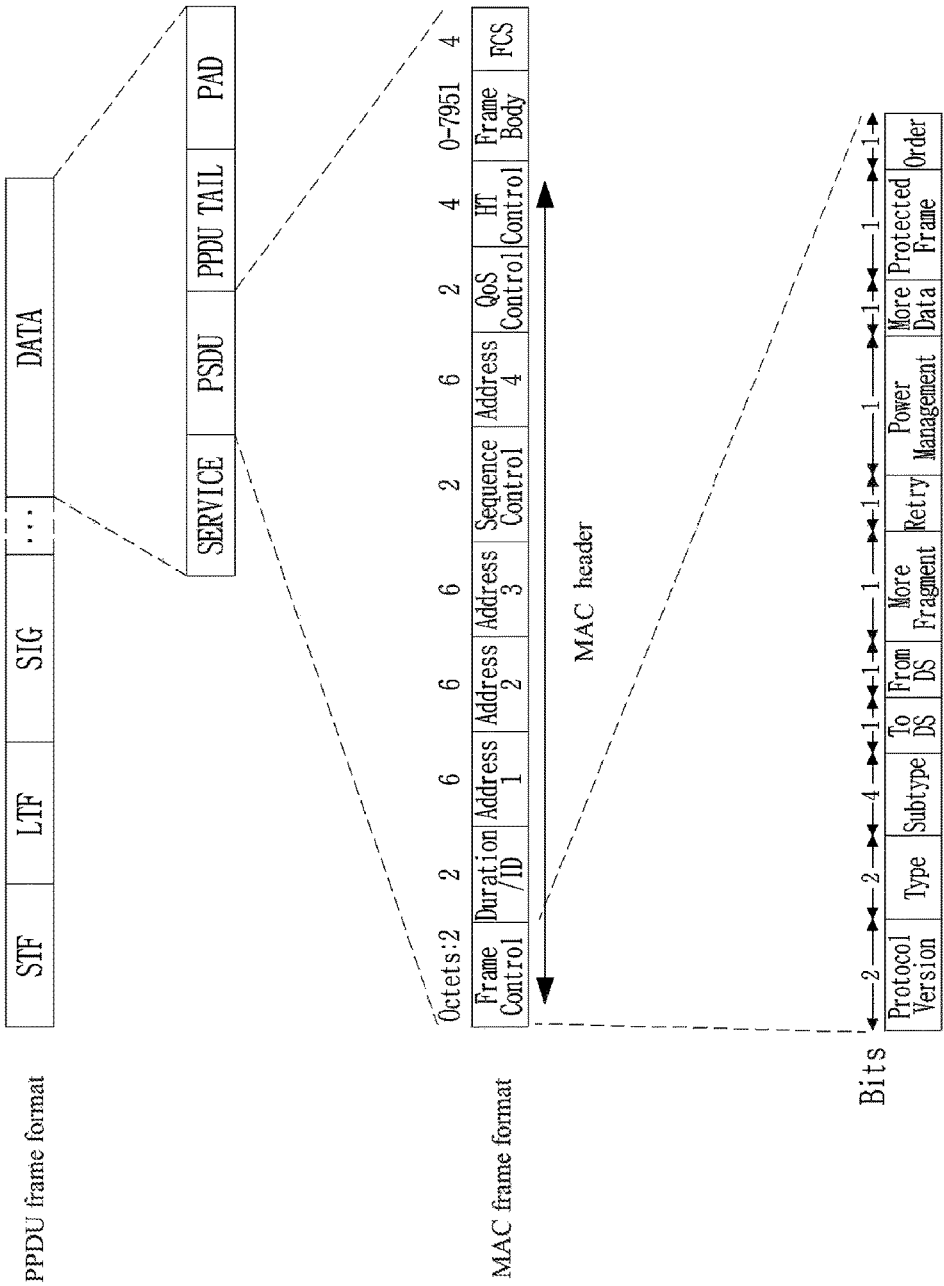
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'RE PPDU' (similarly, HEW xyz may be referred to as 'RE xyz' or 'RE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
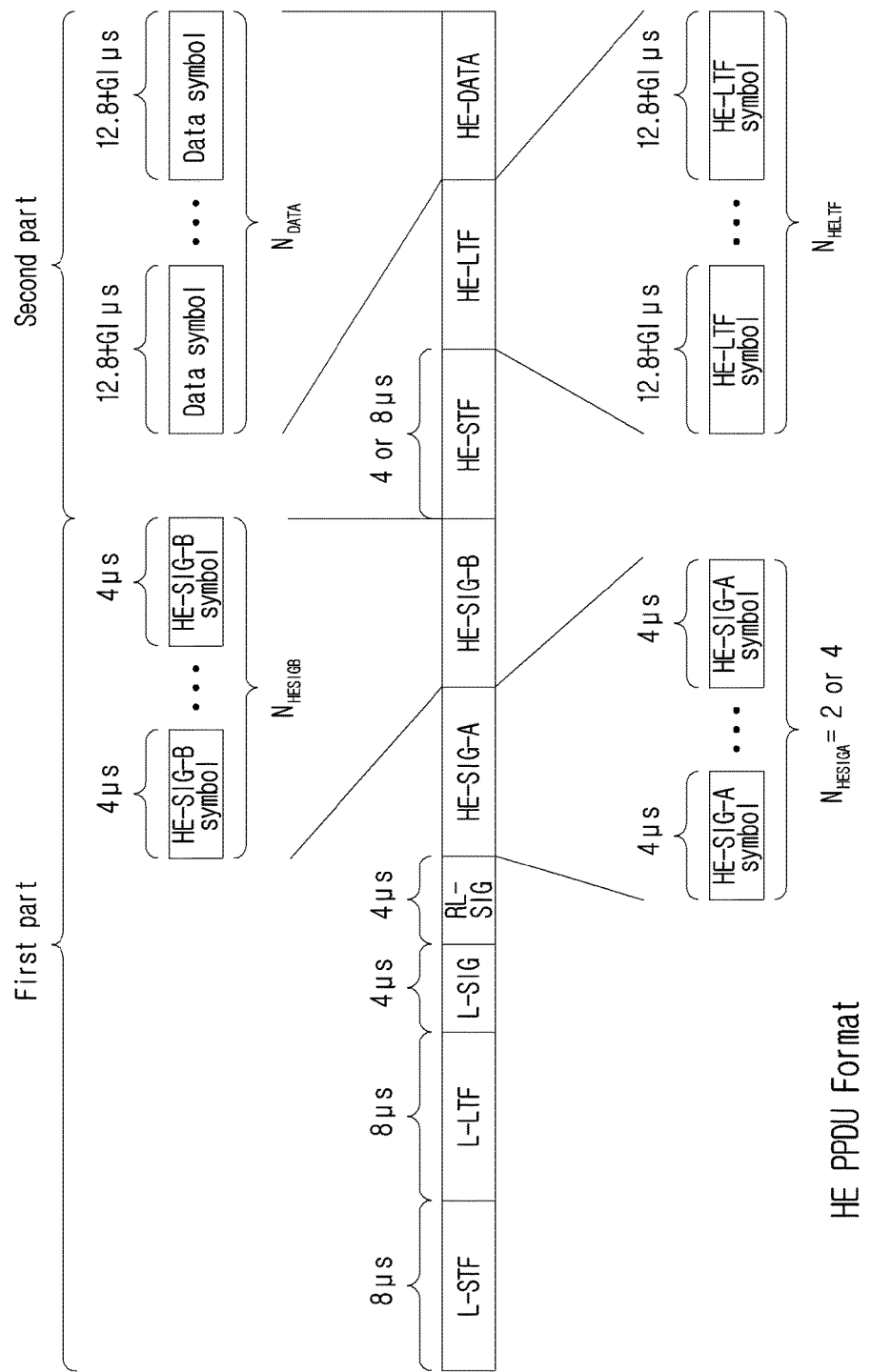
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 µs may be included in the first part. 256-FFT based on a channel bandwidth of 20 MHz may be applied to the second part and a basic subcarrier spacing of 75.125 kHz and a basic DFT period of 12.8 µs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table 1.

L-STF, L-LTF, L-SIG, and RL-SIG may be called legacy preambles.

TABLE 1

| Element | definition | duration | DFT period | GI | Subcarrier spacing | Description |
|---|---|---|---|---|---|---|
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

HE-SIG-A is a HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}$*(DFT period+GI)/μs. $N_{HELTF}$ represents the number of HE-LTF symbols and may have a value of 1, 2, 4, 6, or 8. A HE PPDU may support a 2×LTF mode and a 4×LTF mode. In the 2×LTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4×LTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2×LTF may have a DFT period of 6.4 μs and 4×LTF may have a DFT period of 12.8 μs. A GI of HE-LTF may support 0.8 μs, 1.6 μs, and 3.2 μs. 2×LTF may have a subcarrier spacing equivalent to 156.25 kHz and 4×LTF may have a subcarrier spacing of 78.125 kHz.

HE-DATA is a HE DATA field and may have a duration of, $N_{DATA}$*(DFT period+GI)/μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
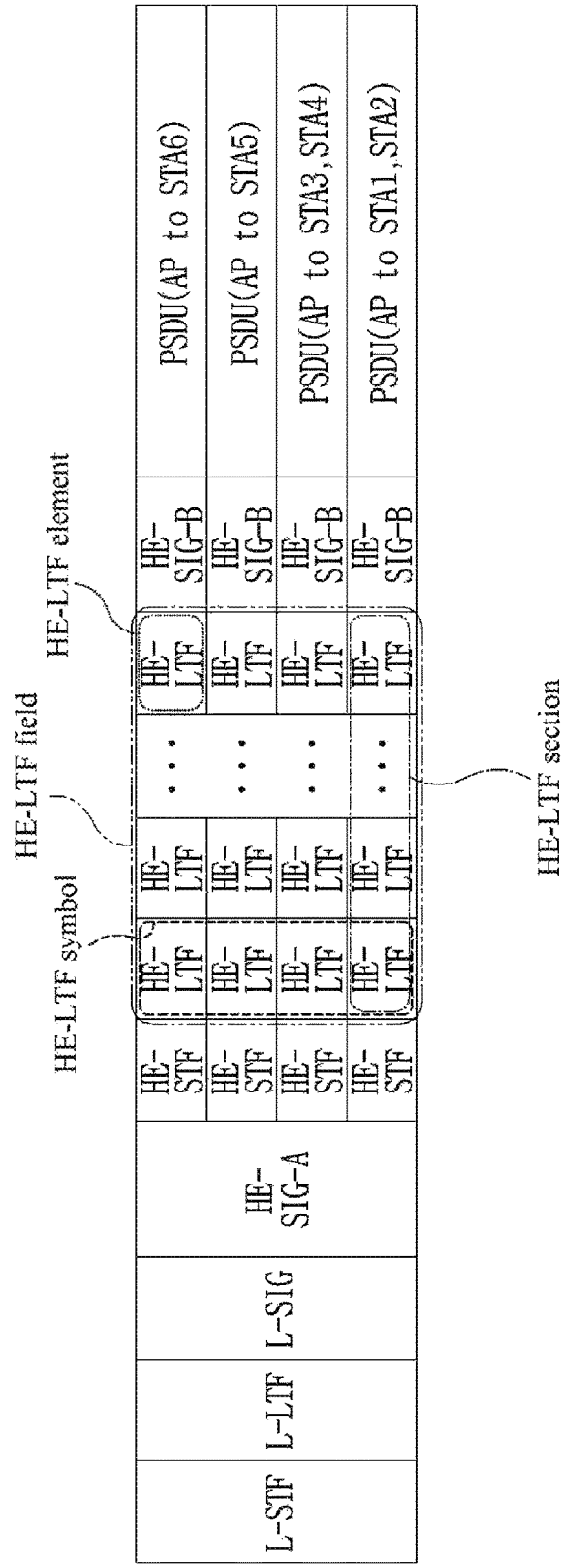
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size).

In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STAG.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 Hz, and 3 for 160 MHz and 80 + 80 MHz |
| | B2 | Reserved | 1 | Reserved. Set to 1. |
| | B3 | STBC | 1 | For a VHT SU PPDU:<br>Set to 1 if space time block coding used and set to 0 otherwise.<br>For a VHT MU PPDU:<br>Set to 0. |
| | B4-B9 | Group ID | 6 | Set to the value of the TX VECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, ..., NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC.<br>If the MU[0] NSTS field is 0, then this field is reserved and set to 1. |
| | B3 | LDPC Extra OFDM Symbol | 1 | Set to if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU [1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates |

TABLE 2-continued

| Two parts of VHT-SIG-A | Bit | Field | Number of bits | Description |
|---|---|---|---|---|
| | | | | coding for user u with USER_POSITION[n] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE—If equal to 1 smoothing is not recommended. |
| | B9 | Reserved | 1 | Reserved and set to 1 |
| | B10-B17 | CRC | 8 | CRC calculated as in 20.3.9:4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B1 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present disclosure, the HE-SIG-A field may include one or more of the fields included in the VHT-SIG-A field, and it may provide backward compatibility with IEEE 802.11ac stations.

Figure 9:
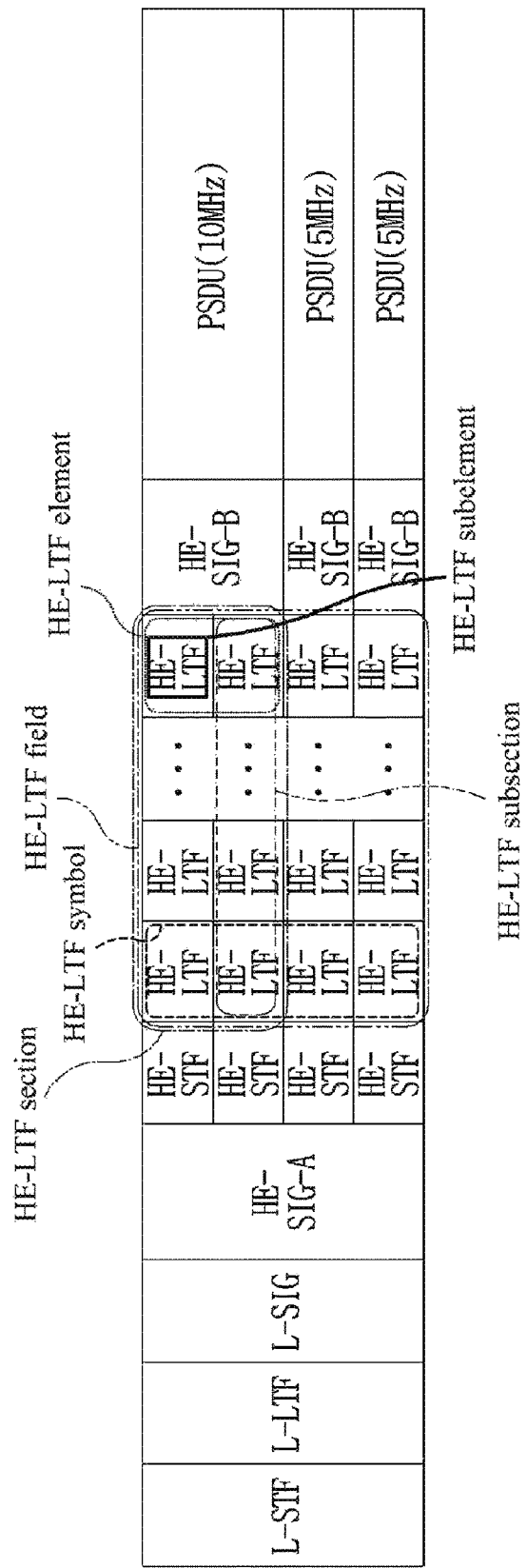
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
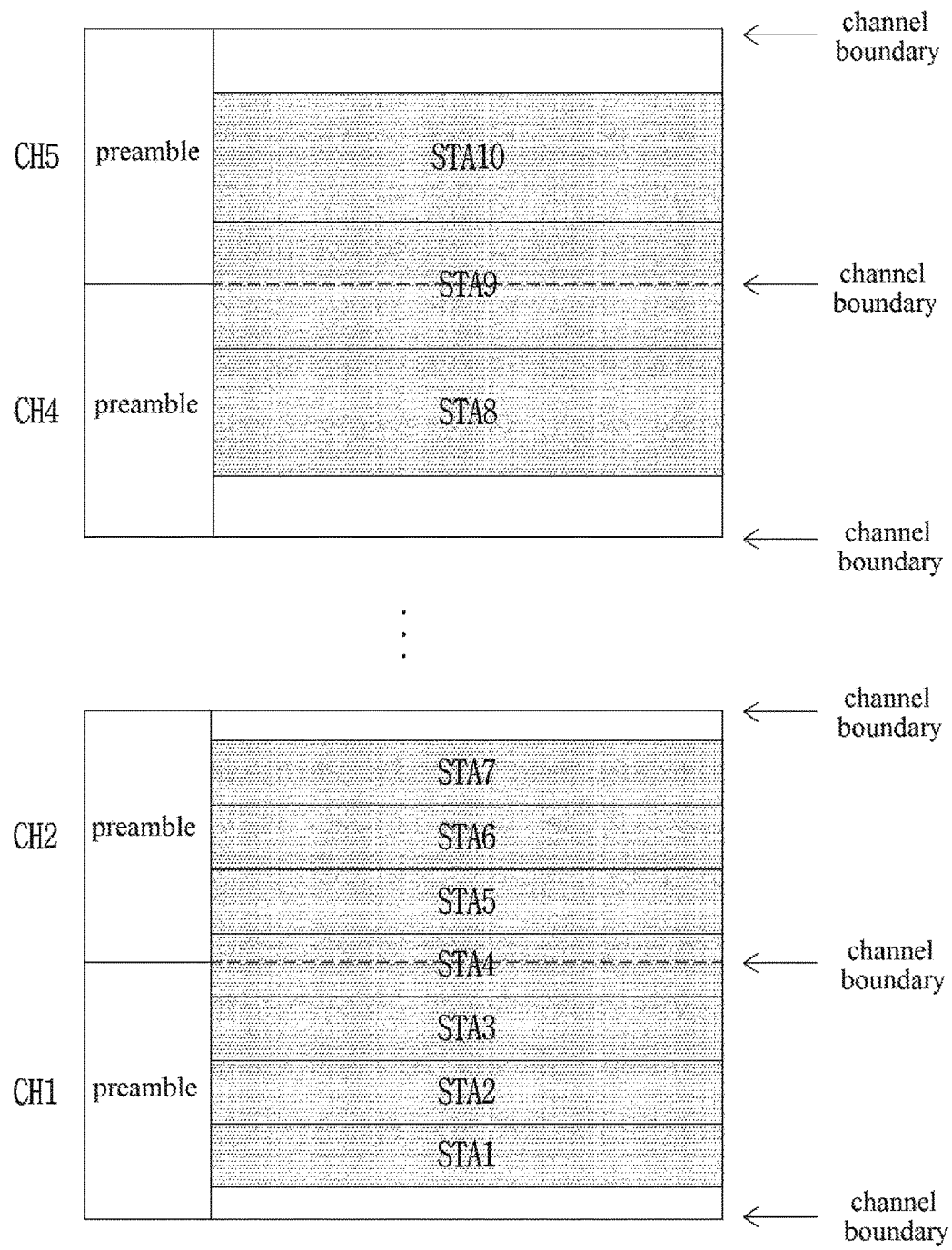
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present disclosure, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present disclosure, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present disclosure, relationship between a total number of spatial streams transmitted on one subchannel and a number of HE-LTFs is listed in [Table 3].

TABLE 3

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

Figure 13:
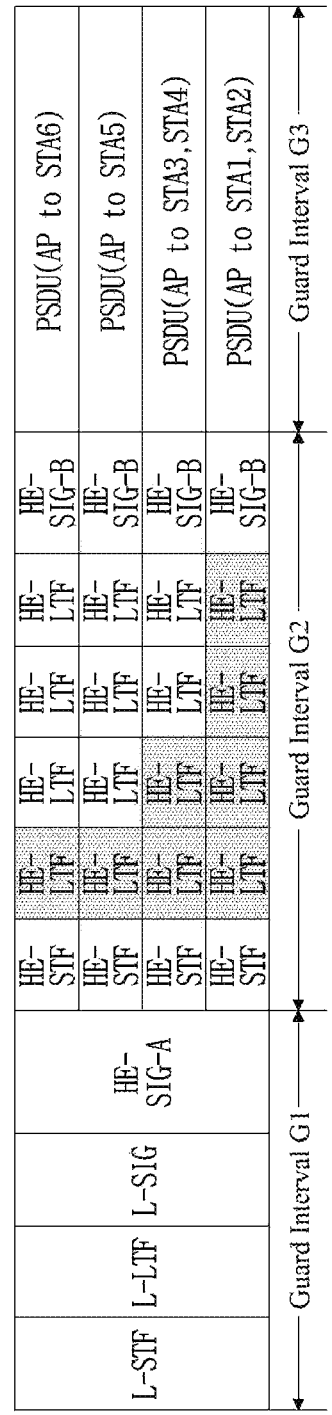
FIG. 13 depicts another example of a HE PPDU frame format according to the present disclosure.

FIG. 13 depicts OFDM symbol durations and GI lengths in the HE PPDU frame format according to the present disclosure.

In the HE PPDU frame format according to the present disclosure, L-STF, L-LTF, L-SIG, and HE-SIG-A fields may be configured with 4.0-μs OFDM symbols based on 64-FFT. One OFDM symbol has a GI of 0.8 μs. In the present disclosure, a GI value applied to the L-STF, L-LTF, L-SIG, and HE-SIG-A fields is defined as GI. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. Unlike G1, G2 and G3 may vary according to a transmitted PPDU transmission vector, rather than they are fixed values (i.e., predetermined values). This is related to that the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 μs, G2 may be a value selected from 3.2 μs, 1.6 μs, 0.8 μs, and 0.4 μs, and G3 may be a value selected from among 3.2 μs, 1.6 μs, 0.8 μs, and 0.4 μs. Also, G1 may have a fixed value (i.e., a predetermined value) of 0.8 μs, and G2 or G3 may be a value selected or determined from among 3.2 μs, 1.6 μs, 0.8 μs and 0.4 μs. G1 does not require separate signaling because G1 is a fixed value, and signaling information indicating G2 and G3 may be provided in the HE-SIG-A field to a HE STA.

G2 and G3 are applied commonly across all OFDM symbols transmitted during a corresponding time period and across all subchannels. Accordingly, PSDU transmission timings and OFDM symbol timings may be synchronized. For example, it is not allowed to apply a 3.2-μs G2 value to a subchannel and a 1.6-μs or 0.8-μs G2 value to another subchannel during a specific time period. Rather, the same 3.2-μs G2 value may be applied to the subchannels during the same time period. In a similar example, it is not allowed to apply a 1.6-μs G3 value to a subchannel and a 3.2-μs or 0.8-μs G3 value to another subchannel during a specific time period. Rather, the same 1.6-μs G3 value may be applied to the subchannels during the same time period.

In the case where a HE PPDU frame format having HE-LTF sections of different lengths for subchannels is used (i.e., in the case where the number of HE-LTFs is not determined for each subchannel based on the maximum of the numbers of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where a HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value.

In the example of FIG. 13, OFDM symbol durations S1, S2, and S3 may be applied respectively to time periods to which the GIs G1, G2, and G3 are applied.

Figure 14:
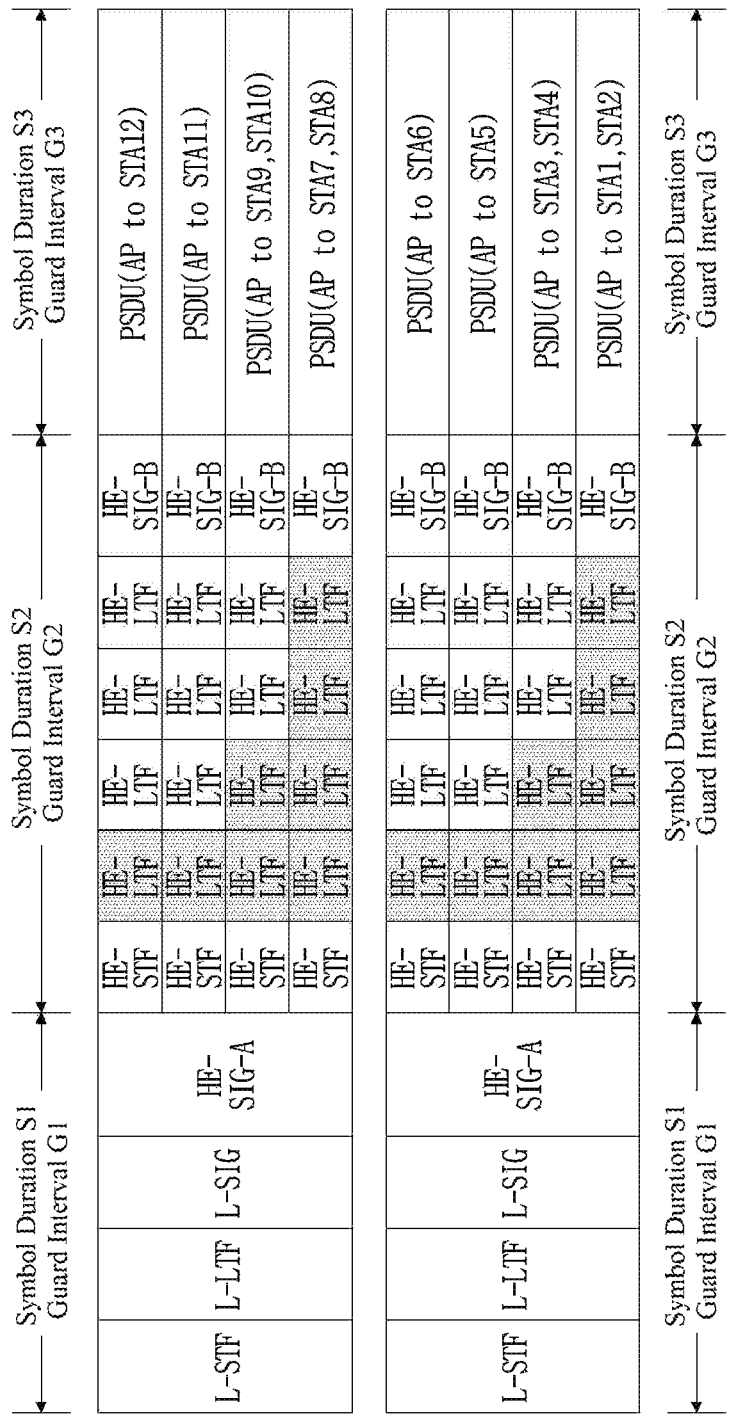
FIG. 14 depicts an exemplary HE PPDU frame format for a wide channel band according to the present disclosure.

FIG. 14 depicts an exemplary HE PPDU frame format for a wide channel band according to the present disclosure.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the numbers of HE-LTFs to be transmitted on all subchannels may be determined according to the maximum of the numbers of HE-LTFs required according to the total numbers of spatial streams transmitted on each subchannels over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO-mode or OFDMA-mode transmission of a HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz subchannel are S1 and G1, respectively. Like the first 20-MHz subchannel, the first 20-MHz subchannel has S1 and G1 respectively as the OFDM symbol duration and GI of L-STF, L-LTF, L-SIG, and HE-SIG-A fields.

In FIG. 14, a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and a HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example means that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modification example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel are the same fixed values in every 20-MHz channel.

Further, this modification example may include application of the example described before with reference to FIG. 11 in which subchannels have the same HE-LTF section length' only to subchannels within one 20-MHz channel, not to the HE-LTF section length of subchannels in another 20-MHz channel.

With reference to the foregoing examples of the present disclosure, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel BandWidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 15 may be used for a UL HE PPDU transmission.

FIG. 15 depicts another exemplary HE PPDU frame format according to the present disclosure. The HE PPDU frame format illustrated in FIG. 15 is characterized in that a structure of HE-SIG-A, HE-SIG-B, and HE-SIG-C fields similar to in FIG. 11 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 15 may not exist. In this case, a description of each field given below may be applied only in the presence of the field.

In the example of FIG. 15, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-μs OFDM symbols based on 64-FFT. One OFDM symbol has a GI of 0.8 μs. In the present description, A GI value applied to the L-STF, L-LTF, L-SIG, and HE-SIG-A fields is defined as G1. Excluding the GI, the L-STF, L-LTF, L-SIG, and HE-SIG-A fields may be configured as 3.2-μs OFDM symbols based on 64-FFT.

In the example of FIG. 15, a HE-STF field, a HE-LTF field, a HE-SIG-B field, HE-LTF elements(s) in a HE-LTF section, HE-SIG-C field and a PSDU may include 16-μs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. Unlike G1, G2 and G3 may vary according to an each transmitted PPDU transmission vector, rather than they are fixed values (i.e. predetermined values known to both a transmitter and a receiver). This is related to the fact that the lengths of the HE-STF, the HE-LTF, the HE-SIG-B, the HE-LTF element(s) in a HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, G1 may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, G1 may be a fixed value (i.e. a predefined value known to both a transmitter and a receiver) of 0.8 μs, and G2 or G3 may be a value selected or indicated from among 3.2 μs, 1.6 μs, 0.8 μs and 0.4 μs. G1 does not require signaling because G1 is a fixed value, and signaling information indicating G2 and G3 may be provided to the AP. If a HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that, if a 3.2-μs G2 value is applied to a subchannel during a specific time period, a 1.6-μs or 0.8-μs G2 value is applied to other subchannels during the same time period. Rather, the same 3.2-μs G2 value may be applied to other subchannels during the same time period. In a similar example, it is not allowed that, if a 1.6-μs G3 value is applied to a subchannel during a specific time period, a 3.2-μs or 0.8-μs G3 value is applied to other subchannels during the same time period. Rather, the same 1.6-μs G3 value may be applied to other subchannels during the same time period.

In the case where a HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values may need to be selected or indicated as G2 and G3 in this case.

In the case where a HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values as G2 and G3 does not cause a problem. However, even in this case, selection or indication of the same values as G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Hereinafter, examples of the present disclosure for applying beamforming and acquiring Channel State Information (CSI) in HE PPDU transmission for DL/UL MU transmission will be described. Beamforming transmission may mean a transmission scheme for controlling directions of beams to each STA and the CSI may include channel state information needed to calculate a beamforming steering matrix. Specifically, a description will be given of a HE PPDU frame configuration when beamforming is applied for DL/UL MU transmission, a procedure for a beamformer (i.e., a transmitter of a beamformed signal) to acquire the CSI from a beamformee (i.e., a receiver of the beamformed signal), and a frame configuration used for the CSI acquisition procedure.

According to the present disclosure, in DL MU transmission or UL MU transmission, whether beamforming is applied to a plurality of subchannels (or a plurality of STAs) in a HE PPDU transmitted over one transmission channel divided into the plurality of subchannels may be identically or differently configured.

In addition, information indicating whether beamforming is applied to each subchannel (or each STA) may be included in a HE-SIG field in a HE PPDU format supporting beamforming in DL MU transmission or UL MU transmission. Further, information directly or indirectly indicating whether beamforming is applied to each subchannel (or each STA) may be included in a trigger frame triggering UL MU transmission in order to support beamforming in UL MU transmission.

According to the present disclosure, an AP may simultaneously receive CSI from a plurality of STAs for beamformed DL MU transmission. For the AP to acquire the CSI from the multiple STAs, an NDP sounding procedure may be performed. The AP may determine whether beamforming is applied to the multiple STAs (or multiple subchannels allocated to the multiple STAs) based on the CSI acquired from the multiple STAs.

Hereinafter, various embodiments of the present disclosure for beamforming support in a HE PPDU will be described in more detail.

FIGS. 16 and 17 depict exemplary HE PPDU frame formats supporting beamforming according to the present disclosure.

In the example of FIG. 16, an AP corresponding to a beamformer transmits PSDUs over subchannels allocated respectively to STA1, STA2, STA3, and STA4 corresponding to beamformees. Signaling information indicating whether beamforming is applied to a PSDU over each subchannel may be included in a HE-SIG-B field of a HE PPDU.

Whether beamforming is applied to each of multiple subchannels in one channel may be individually or independently determined. That is, beamforming may be identically or differently applied to multiple subchannels (or multiple STAs). In this case, signaling bits having the same size as the number of subchannels are needed. For example, whether beamforming is applied to each of N subchannels may be indicated by N-bit signaling information and a bit value (i.e., 0 or 1) of a bit position of each of N bits may indicate that beamforming is not applied or is applied to one subchannel.

Alternatively, whether beamforming is applied to a plurality of subchannels in one channel may be commonly determined. That is, beamforming may be identically applied or may not be identically applied to all the subchannels. In this case, the signaling information may have a size of one bit.

In the example of FIG. 17, an AP corresponding to a beamformer transmits PSDUs over subchannels allocated respectively to STA1, STA2, STA3, and STA4 corresponding to beamformees. Signaling information indicating whether beamforming is allocated to a PSDU over each subchannel may be included in a HE-SIG-B field of a HE PPDU.

If the HE-SIG-B field is transmitted over each subchannel, 1-bit signaling information indicating whether beamforming is applied to a corresponding subchannel may be included in one HE-SIG-B field. Whether beamforming is applied to each of multiple subchannels may be individually or independently determined.

If the HE-SIG-B field is commonly transmitted over the multiple subchannels, N-bit signaling information individually indicating whether beamforming is applied to N subchannels or 1-bit signaling information commonly indicating whether beamforming is applied to the N subchannels may be included in the HE-SIG-B field.

In this way, the signaling information indicating whether beamforming is applied to the multiple subchannels may be included in a HE-SIG field (e.g., the HE-SIG-A or HE-SIG-B field). More specifically, the signaling information indicating whether beamforming is applied to the multiple subchannels may be included in the HE-SIG field transmitted prior to a HE-LTF field. A HE-LTF section in each subchannel is used for channel estimation of the corresponding subchannel and channel estimation may vary according to whether beamforming is applied to the subchannel. Therefore, the information indicating whether beamforming is applied may be transmitted at least before the HE-LTF field (or before a HE-STF field).

In addition, in beamformed HE PPDU transmission, a beamforming steering matrix may be applied to a transmission signal waveform and, in this case, smoothing may not be applied. Smoothing refers to acquisition of noise suppression gain in consideration of a neighboring subcarrier signal in channel estimation, using a high channel correlation between adjacent subcarriers in a channel environment in which delay spread is low. In beamformed HE PPDU transmission, since a channel correlation between adjacent subcarriers may not be maintained, channel estimation performed by reflecting an adjacent subcarrier signal through smoothing may not necessarily ensure noise suppression. Specifically, if whether beamforming is applied to each of multiple subchannels in beamformed HE PPDU transmission is individually or independently determined, subchannels to which beamforming is not applied and subchannels to which beamforming is applied may be adjacent to each other and, in this case, smoothing may not be applied to adjacent subcarriers over a subchannel boundary.

Thus, a certain STA may not apply smoothing to subcarrier(s) located at a boundary of subcarriers allocated thereto. For example, in the example of FIG. 16 or 17, if STA2 is not aware of whether beamforming is applied to other subchannels (e.g., a subchannel allocated to STA1 and a subchannel allocated to STA3) adjacent to a subchannel allocated to STA2, STA2 may not apply smoothing to subcarriers located at a subcarrier boundary (i.e., subcarriers adjacent to the subchannel allocated to STA1 and subcarriers adjacent to the subchannel allocated to STA3) in the subchannel allocated to STA2.

Figure 18:
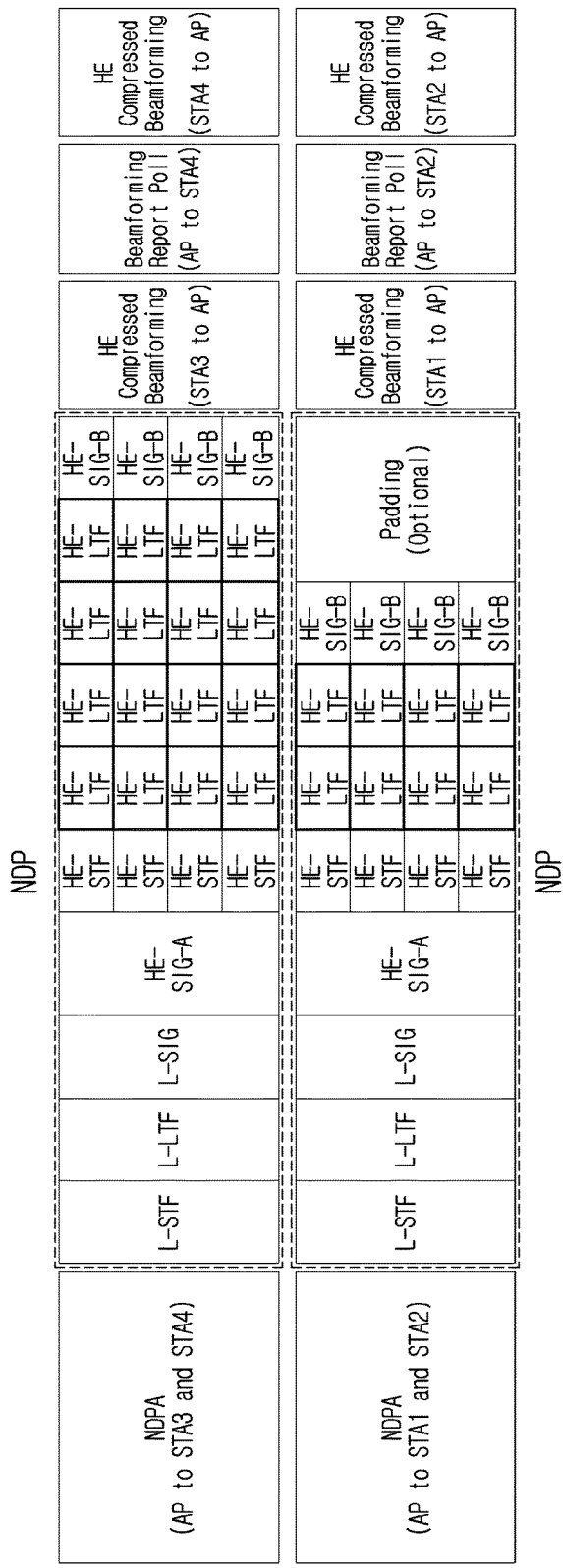
FIG. 18 depicts an exemplary sounding protocol according to the present disclosure.

FIG. 18 depicts an exemplary sounding protocol according to the present disclosure.

A sounding protocol is a procedure in which an AP acquires feedback information about CSI between the AP and an STA from the STA in order for the AP to perform beamforming transmission to the STA. Through the sounding procedure, the AP may transmit an NDP frame (i.e., a PPDU frame having a PSDU of length 0) to the STA and the STA may determine the CSI based on the NDP frame and transmit a determined result (i.e., feedback information) to the AP. The CSI determined based on the NDP frame may be fed back to the AP that has requested sounding through a compressed beamforming frame. The NDP frame transmitted by the AP may be received by a plurality of STAs and the AP may acquire the feedback information from each STA.

Prior to transmission of the NDP frame by the AP, an NDP Announcement (NDPA) frame may be transmitted. The NDPA frame is a PPDU frame indicating that the NDP frame immediately follows the NDPA frame (e.g., that the NDP frame will be transmitted after an SIFS from an end time point of the NDPA frame). The first STA of an STA list included in the NDPA frame may receive the NDP frame even without receiving an additional polling frame (e.g. a Beamforming Report Polling frame) from the AP and then immediately transmit a feedback frame to the AP (e.g., after an SIFS from a reception end time point of the NDP frame). The other STAs included in the NDPA frame may receive the polling frame (e.g., the Beamforming Report Poll frame) from the AP and then immediately transmit the feedback frame (e.g., a frame including a Beamforming Report field) to the AP (e.g., after an SIFS from a reception end time point of the polling frame). Herein, the polling frame may be transmitted from the AP to an STA immediately after a compressed beamforming frame from the STA is ended (e.g., after an SIFS from an end time point of the compressed beamforming frame).

The NDPA frame should be transmitted so as to be received by target STAs of the sounding procedure. Therefore, beamforming may not be applied to transmission of the NDPA frame (i.e. the NDPA frame may be omnidirectionally transmitted).

In this way, since both the NDP frame and the Beamforming Report Poll frame, transmitted by an STA (e.g., an AP) requesting feedback in the sounding procedure, have features in common in that they are frames for triggering the feedback frame (e.g., a frame including a Beamforming Report field) from target STAs (e.g., STA1, STA2, STA3, and STA4) of the sounding procedure, the NDPA frame, the NDP frame and the Beamforming Report Poll frame may be collectively referred to as feedback trigger frames.

In the example of FIG. 18, an AP corresponding to a beamformer transmits the NDPA frame to STA1, STA2, STA3, and STA4 corresponding to beamformees and transmits the NDP frame (i.e. the PPDU frame only including a legacy preamble (i.e., an L-STF, an L-LTF, and L-SIG field) and a HE-preamble (i.e. a HE-SIG-A field, a HE-STF, and HE-LTF)) after an SIFS. STA1, STA2, STA3, and STA4 corresponding to the beamformees may be aware that they are target STAs of NDP sounding by receiving the NDPA frame and the NDP frame and perform channel estimation using the NDP frame. After receiving the feedback trigger frame (e.g., the NDPA frame, the NDP frame, or the Beamforming Report Poll frame), each STA transmits the result (e.g., CSI) of channel estimation to the AP through a HE compressed beamforming frame after an SIFS.

In the example of FIG. 18, a plurality of STAs simultaneously transmits HE compressed beamforming frames (e.g., frames including the CSI).

Specifically, in the example of FIG. 18, it is assumed that beamformee Space Time Stream (STS) capabilities of STA1 and STA2 indicate that a maximum of two STSs is supported and beamformee STS capabilities of STA3 and STA4 indicate that a maximum of four STSs is supported. In this case, the NDP frame cannot request channel estimation for STSs exceeding the number of beamformee STS capabilities. For example, if beamformee STS capabilities indicate that a maximum of two STSs is supported, the NDP frame transmitted by the beamformer may request channel estimation for the two STSs and cannot request channel estimation for more than two STSs (e.g., 3, 4, 5, 6, 7, or 8 STSs).

Since the number of HE-LTFs in the HE PPDU is determined based on the number of STSs as described above, the number of HE-LTFs used for channel estimation for STSs in the NDP frame may be determined based on the beamformee STS capabilities. That is, as in the example of FIG. 18, the NDP frame for STA1 and STA2 supporting a maximum of two STSs may include two HE-LTFs and the NDP frame for STA3 and STA4 supporting a maximum of four STSs may include four HE-LTFs.

Furthermore, in NDP sounding according to the present disclosure, simultaneously performing NDP sounding with respect to STAs having different beamformee STS capabilities may be supported. As in the example of FIG. 18, NDP sounding over a low channel (e.g., one 20 MHz channel of a low frequency side out of two 20 MHz channels constituting a 40 MHz channel when NDP sounding is performed over a 40 MHz channel in FIG. 18) for STA1 and STA2, beamformee STS capabilities of which support two STSs, and NDP sounding over a high channel (e.g., one 20 MHz channel of a high frequency side out of two 20 MHz channels constituting a 40 MHz channel) for STA3 and STA4, beamformee STS capabilities of which support four STSs, may be simultaneously performed.

Specifically, in the example of FIG. 18, the AP may request that STAs transmit CSI on a channel (or subchannel) basis and receive the CSI. For example, the AP may perform NDP sounding using a 40 MHz channel with respect to STA1, STA2, STA3, and STA4. In this case, the AP may transmit the NDPA frame and the NDP frame over a low 20 MHz channel for the purpose of requesting that STA1 and STA2 transmit the CSI for a low 20 MHz channel and then the AP may receive the CSI of a low 20 MHz channel through the compressed beamforming frame from STA1 and STA2. At the same time, the AP may transmit the NDPA frame and the NDP frame over a high 20 MHz channel for the purpose of requesting that STA3 and STA4 transmit CSI for a high 20 MHz channel and then the AP may receive the CSI of a high 20 MHz channel through the compressed beamforming frame from STA3 and STA4.

The NDPA frame transmitted over a low channel may include STA1 and STA2 in an NDP sounding target STA list and the NDPA frame transmitted over a high channel may include STA3 and STA4 in the NDP sounding target STA list. The NDPA frames over a low channel and a high channel may be simultaneously transmitted.

The NDP frame transmitted after an SIFS from an NDPA frame end time point over a low channel may include two HE-LTFs for channel estimation for two STSs corresponding to beamformee STS capabilities of STA1 and STA2. The NDP frame transmitted after an SIFS from an NDPA frame end time point over a high channel may include four HE-LTFs for channel estimation for four STSs corresponding to beamformee STS capabilities of STA3 and STA4. The NDP frames over a low channel and a high channel may be simultaneously transmitted.

If the number of HE-LTFs of the NDP frame transmitted over a low channel is different from that of the NDP transmitted over a high channel, transmission times of the NDP frames (i.e. NDP frame end time points) may be different. In this case, HE compressed beamforming frames transmitted as an immediate response to the NDP frames may become different over a low channel and a high channel.

To simultaneously transmit the HE compressed beamforming frames over a low channel and a high channel, the transmission times of the NDP frames (i.e., lengths of the NDP frames) over a plurality of channels may be set to be equal. To equally match the length of the NDP frame transmitted over a low channel with the length of the NDP frame transmitted over a high channel as in the example of FIG. 18, a padding field may be included in the NDP frame transmitted over a low channel after a HE preamble. The padding field may correspond to additional transmission of a field of the HE preamble (e.g., a HE-LTF field or a HE-SIG-B field) or may be configured by a signal having a predetermined pattern. If the padding field is added to any NDP frame, the length of the padding field may be set to a length difference between any NDP frame and another simultaneously transmitted NDP frame (e.g., difference between the length of the NDP frame transmitted over a high channel and the length of the NDP frame transmitted over a low channel).

Figure 19:
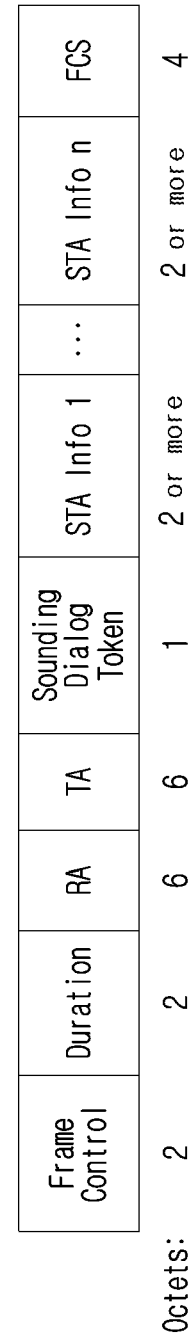
FIG. 19 depicts an exemplary NDPA frame format according to the present disclosure.

FIG. 19 depicts an exemplary NDPA frame format according to the present disclosure.

In the example of FIG. 19, a frame format of an MPDU included in a PSDU of a PPDU (or a HE PPDU) corresponding to an NDPA is illustrated.

A Receiver Address (RA) field may be set to an address of a receiving STA of a corresponding frame. If an NDPA frame includes one STA Information (Info) field, the RA field may be set to an address of a corresponding STA. If the NDPA frame includes a plurality of STA Info fields, the RA field may be set to a broadcast address.

A Transmitter Address (TA) field may be set to an address of a transmitting STA of a corresponding frame.

A Sounding Dialog Token field may be set to a value selected by a beamformer (e.g., an AP) in order to identify the NDPA frame.

The STA Info field may include information for designating beamformee(s) corresponding to a target STA of NDP sounding. The NDPA frame may include one or multiple STA Info fields.

One STA Info field may include at least one of an Association Identifier (AID) subfield, a Feedback Type subfield, an Nc Index subfield, an Nr Index subfield, a Grouping subfield, and a Codebook Information subfield.

The AID subfield (e.g., 12-bit size) may include 12 Least Significant Bits (LSBs) of an AID of an STA that is expected to prepare sounding feedback by processing an NDP frame following the NDPA frame. If the STA is an AP, a mesh STA, or a member of an IBSS, the AID subfield may be set to a value of 0.

The Feedback Type subfield (e.g., 1-bit size) may indicate a requested feedback type. If the Feedback Type subfield is set to 0, this may indicate SU type feedback and, if the Feedback Type subfield is set to 1, this may indicate MU type feedback.

The Nc Index subfield (e.g., 3-bit size) may be set to a value obtained by subtracting one from the number of columns of a Compressed Beamforming Feedback Matrix subfield. If Nc=1, 2, 3, . . . , 8, then the Nc Index subfield may be set to a value of 0, 1, 2, . . . , 7, respectively.

Herein, the Compressed Beamforming Feedback Matrix subfield may be included in a Compressed Beamforming Report field of a HE Compressed Beamforming frame and may include information about a compressed beamforming feedback matrix to be applied to a specific subcarrier. The compressed beamforming feedback matrix may have a plurality of rows and one or more columns and elements of the matrix may indicate respective specific angles. The compressed beamforming feedback matrix fed back through the Compressed Beamforming Report field may be used for a transmission beamformer to determine a steering matrix.

The Nr Index subfield (e.g., 3-bit size) may be set to a value obtained by subtracting one from the number of rows of the compressed beamforming feedback matrix. If Nr=1, 2, 3, . . . , 8, then the Nr Index subfield may be set to a value of 0, 1, 2, . . . , 7, respectively.

The Grouping subfield (e.g., 2-bit size) may be set to a value indicating a subcarrier grouping level, i.e., Ng, used for the compressed beamforming feedback matrix. If Ng=1 (i.e., if there is no subcarrier grouping), the Grouping subfield may be set to a value of 0. If Ng=2 (i.e., if only one compressed beamforming feedback matrix is reported with respect to a group including two adjacent subcarriers), the Grouping subfield may be set to a value of 1. If Ng=4 (i.e., if only one compressed beamforming feedback matrix is reported with respect to a group including four adjacent subcarriers), the Grouping subfield may be set to a value of 2. The Grouping subfield set to a value of 3 may be reserved.

The Codebook Information subfield (e.g., 1-bit size) may be set to a value indicating the size of a codebook entry.

Upon receiving the NDPA frame and the NDP frame following the NDPA frame, configured as described above, beamformees (e.g., STAs) may transmit a plurality of HE compressed beamforming frames to a beamformer (e.g., AP) over channels receiving the NDPA and the NDP.

Herein, the multiple HE compressed beamforming frames transmitted by the multiple beamformees (e.g., multiple HE compressed beamforming frames as an immediate response to the NDP frame or multiple HE compressed beamforming frames transmitted as an immediate response to the Beamforming Report Poll frame) may be simultaneously transmitted based on configuration by the beamformer. That is, the multiple beamformees may simultaneously transmit the multiple HE compressed beamforming frames based on the NDPA frame transmitted from the beamformer to the multiple beamformees. For example, the multiple beamformees may simultaneously transmit the multiple HE compressed beamforming frames based on information (e.g., one or more of the Feedback Type, Nc Index, Nr Index, Grouping, and Codebook Information subfields of the STA Info field) included in the NDPA frame transmitted from the beamformer to the multiple beamformees.

To simultaneously transmit the multiple HE compressed beamforming frames by the multiple beamformees, the sizes of the HE compressed beamforming frames transmitted by the multiple beamformees may be identically set. The sizes of the HE compressed beamforming frames may be determined based on the information included in the NDPA frame (e.g., one or more of the Feedback Type, Nc Index, Nr Index, Grouping, and Codebook Information subfields of the STA Info field). Specifically, each piece of information included in the NDPA frame provided to the multiple beamformees by the beamformer (e.g., one or more of the Feedback Type, Nc Index, Nr Index, Grouping, and Codebook Information subfields of the STA Info field) may be set to the same value with respect to the multiple beamformees that simultaneously transmit the multiple compressed beamforming frames. Referring back to FIG. 18, the sizes of the HE compressed beamforming frames of STA1 and STA2 may be equally set and the sizes of the HE compressed beamforming frames of STA3 and STA4 may be equally set.

Figure 20:
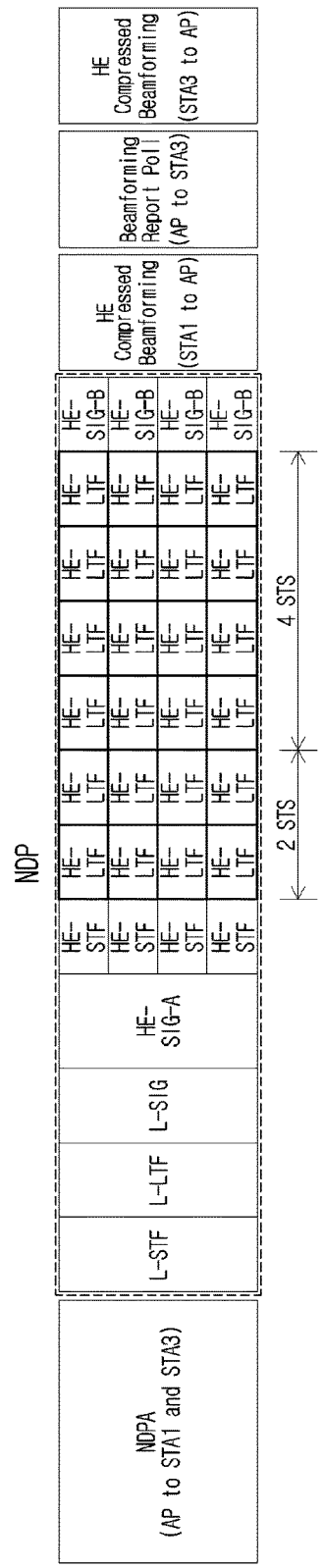
FIG. 20 depicts another exemplary sounding protocols according to the present disclosure.

FIG. 20 depicts another exemplary sounding protocol according to the present disclosure.

FIG. 20 illustrates an additional example for simultaneously performing NDP sounding with respect to STAs having different beamformee STS capabilities. To this end, a plurality of durations corresponding to different beamformee STS capabilities may be consecutively transmitted in a transmission duration of a HE-LTF field used for channel estimation for an STS in an NDP frame format.

In the example of FIG. 20, it may be assumed that beamformee STS capabilities of STA1 and STA2 are two STSs and beamformee STS capabilities of STA3 and STA4 are four STSs. In this case, the number of HE-LTFs out of a HE preamble transmitted after a legacy preamble (an L-STF, an L-LTF, and an L-SIG field) in an NDP frame may be a total of 6. That is, the HE-LTFs of the NDP frame may include HE-LTFs adding two HE-LTFs for channel estimation of two STSs for STA1 and STA2 and four HE-LTFs for channel estimation of four STSs for STA3 and STA4.

In this case, information indicating which HE-LTF is used for channel estimation of a certain STA (or an STS of which STA) may be included in the NDPA frame.

As such, STA1 or STA2 may transmit a HE compressed beamforming frame including a channel estimation value (e.g., CSI) calculated based on the first two HE-LTFs in a HE preamble of the NDP frame to the AP as an immediate response to the NDP frame or an immediate response to a Beamforming Report Poll frame. STA3 or STA4 may transmit a HE compressed beamforming frame including a channel estimation value (e.g., CSI) calculated based on the next four HE-LTFs of the first two HE-LTFs in the HE preamble of the NDP frame to the AP as an immediate response to the NDP frame or as an immediate response to the Beamforming Report Poll frame.

Figure 21:
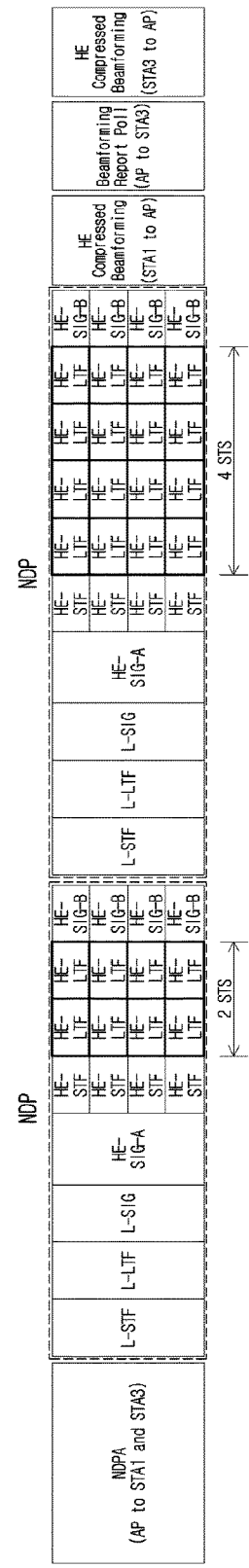
FIG. 21 depicts yet another exemplary sounding protocols according to the present disclosure.

FIG. 21 depicts another exemplary sounding protocol according to the present disclosure.

FIG. 21 illustrates an additional example for simultaneously performing NDP sounding with respect to STAs having different beamformee STS capabilities. To this end, two different NDP frames may be transmitted at an interval of an SIFS after NDPA frame transmission.

In the example of FIG. 21, it may be assumed that beamformee STS capabilities of STA1 and STA2 are two STSs and beamformee STS capabilities of STA3 and STA4 are four STSs. In this case, two HE-LTFs for channel estimation of two STSs for STA1 and STA2 may be included in the first transmitted NDP frame and four HE-LTFs for channel estimation of four STSs for STA3 and STA4 may be included in the second transmitted NDP frame.

In this case, information indicating which NDP frame is used for channel estimation of a certain STA (or an STS of which STA) may be included in the NDPA frame.

As such, STA1 or STA2 may transmit a HE compressed beamforming including a channel estimation value (e.g., CSI) calculated based on two HE-LTFs of the first NDP frame to the AP as an immediate response to the last NDP frame or an immediate response to the Beamforming Report Poll frame. STA3 or STA4 may transmit a HE compressed beamforming frame including a channel estimation value (e.g., CSI) calculated based on four HE-LTFs of the second NDP frame to the AP as an immediate response to the NDP frame or as an immediate response to the Beamforming Report Poll frame.

Although the NDPA frame is transmitted to STA1 and STA3, and STA1 and STA3 transmit the HE compressed beamforming frames in the illustrated examples of FIGS. 20 and 21, the present disclosure is not limited thereto. That is, the NDPA frame for designating one or more of STA1, STA2, STA3, and STA4 as NDP sounding target STAs may be transmitted from the AP, one NDP frame (i.e. the example of FIG. 20) or multiple NDP frames (i.e. the example of FIG. 21) for channel estimation for the designated NDP sounding target STAs may be transmitted from the AP, and the HE compressed beamforming frame from each of the designated target STAs may be transmitted to the AP as an immediate response to the NDP frame or as an immediate response to the Beamforming Report Poll frame.

UL MU-MIMO transmission may be taken as an example of UL MU transmission in the following examples of the present disclosure. However, the examples of the present disclosure are also applicable in the same manner to UL OFDMA transmission in which one transmission channel is divided into a plurality of subchannels and each STA performs simultaneous UL transmission on an allocated subchannel. Similarly, DL MU-MIMO transmission may be taken as an example of DL MU transmission in the following examples of the present disclosure. However, the examples of the present disclosure are also applicable in the same manner to DL OFDMA transmission in which one transmission channel is divided into a plurality of subchannels and simultaneous DL transmission is performed on respective subchannels allocated to STAs. That is, UL MU transmission includes UL MU-MIMO transmission or UL OFDMA transmission, and DL MU transmission includes DL MU-MIMO transmission or DL OFDMA transmission, in the following description.

Figure 22:
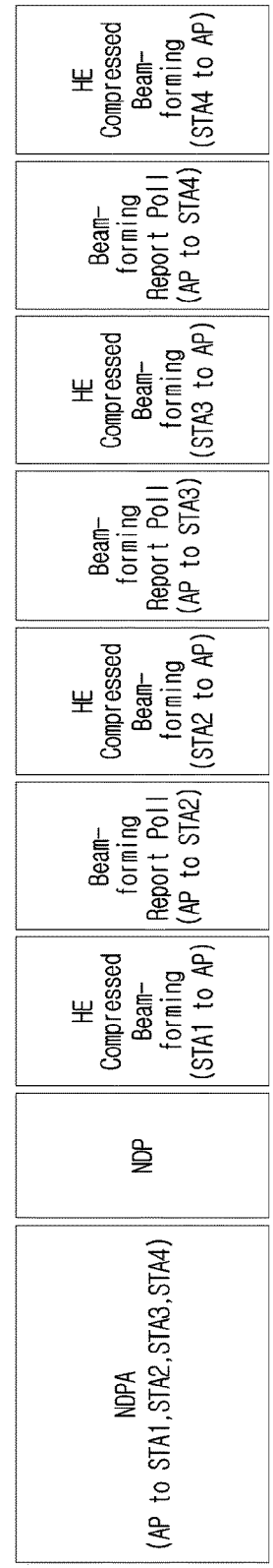
FIG. 22 depicts a sounding procedure including Uplink (UL) Single User (SU) feedbacks according to the present disclosure.

FIG. 22 depicts a sounding procedure including UL SU feedbacks according to the present disclosure.

In the example of FIG. 22, an AP corresponding to a beamformer transmits an NDPA frame to STA1, STA2, STA3, and STA4 corresponding to beamformees. Subsequently, the AP transmits an NDP frame to STA1, STA2, STA3, and STA4 after a predetermined IFS (e.g., an SIFS). STA1, STA2, STA3, and STA4 corresponding to beamformees may receive the NDPA frame and the NDP frame, determine that they are destination STAs of NDP sounding, and perform channel estimation using the NDP frame. The first STA (e.g., STA1) listed in an STA list included in the NDPA frame may transmit a result of channel estimation in a HE Compressed Beamforming frame to the AP a predetermined IFS (e.g., an SIFS) after receiving the NDP frame. Each of STA2, STA3, and STA4 may transmit a result of channel estimation in a HE Compressed Beamforming frame to the AP a predetermined IFS (e.g., an SIFS) after receiving a Beamforming Report Poll frame.

As described above, each of STA1, STA2, STA3, and STA4 may transmit a feedback frame (i.e., a HE Compressed Beamforming frame) in UL SU transmission.

Figure 23:
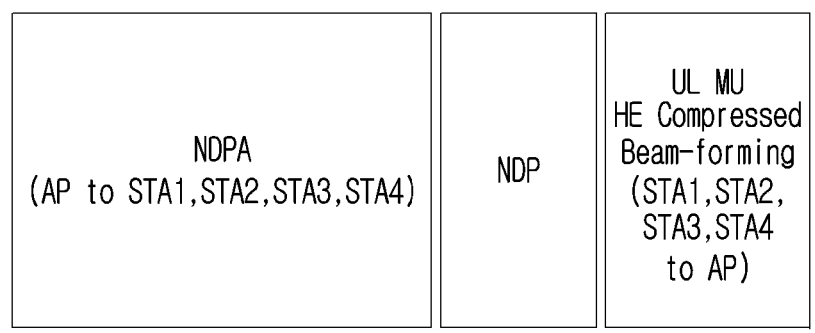
FIG. 23 depicts a sounding procedure including a UL Multi-User (MU) feedback according to the present disclosure.

FIG. 23 depicts a sounding procedure including a UL MU feedback according to the present disclosure.

If all of an AP corresponding to a beamformer and a plurality of STAs corresponding to beamformees support UL MU transmission, a procedure for receiving HE Compressed Beamforming frames from the plurality of STAs by the AP may be simplified.

FIG. 23 illustrates an example in which a plurality of STAs report feedback frames (e.g., UL MU HE Compressed Beamforming frames) simultaneously on a single channel in a WLAN system supporting UL MU transmission (e.g., UL MU-MIMO transmission or UL OFDMA transmission).

That is, a HE PPDU including the feedback frames from the plurality of STAs may be transmitted on the single channel in UL MU transmission.

The simultaneous transmissions of the UL MU HE Compressed Beamforming frame from the plurality of STAs may be configured or indicated by an NDPA frame or a Beamforming Report Poll frame destined for the plurality of STAs in a sounding procedure. That is, the HE NDPA frame or the Beamforming Report Poll frame may further include information initiating or eliciting UL MU transmission (e.g., UL MU transmission trigger information or UL MU transmission scheduling information). Or the HE NDPA frame or the Beamforming Report Poll frame may include a trigger frame initiating or eliciting UL MU transmission.

For example, the beamformee STAs, STA1, STA2, STA3, and STA4 may receive an NDPA frame including UL MU transmission trigger information from the beamformer, the AP and receive an NDP frame after a predetermined IFS (e.g., an SIFS). In this case, STA1, STA2, STA3, and STA4 may simultaneously transmit HE PPDUs (i.e., UL MU HE Compressed Beamforming frames) including their channel estimation results in UL OFMDA or UL MU-MIMO a predetermined IFS (e.g., an SIFS) after receiving the NDP frame.

As described above, the NDPA frame or Beamforming Report Poll frame corresponding to a feedback trigger frame may include information triggering UL SU transmission in the example of FIG. 22 and information triggering UL MU transmission in the example of FIG. 23.

Figure 24:
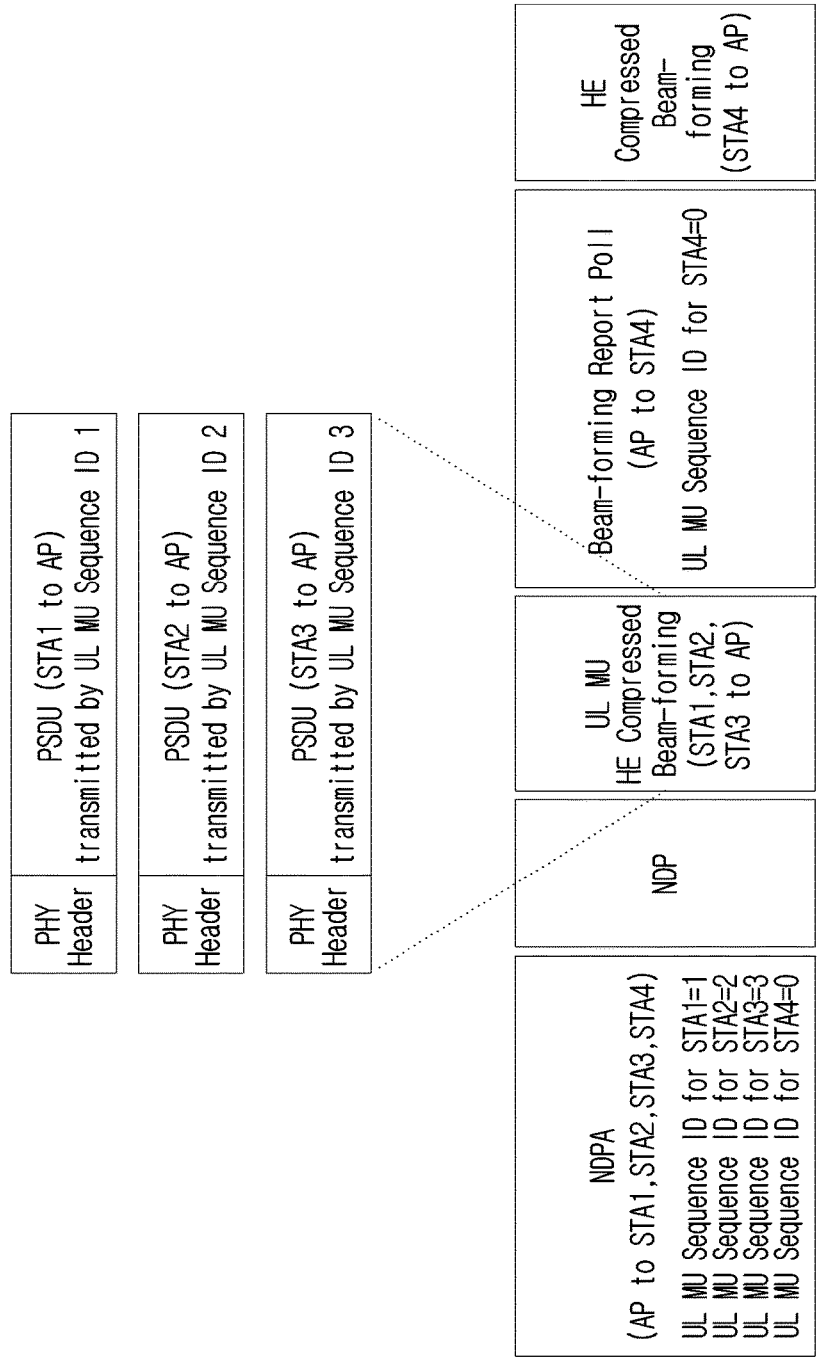
FIGS. 24 and 25 depict UL SU transmission of a feedback frame and UL MU transmission of feedback frames in a sounding procedure according to the present disclosure.
Figure 25:
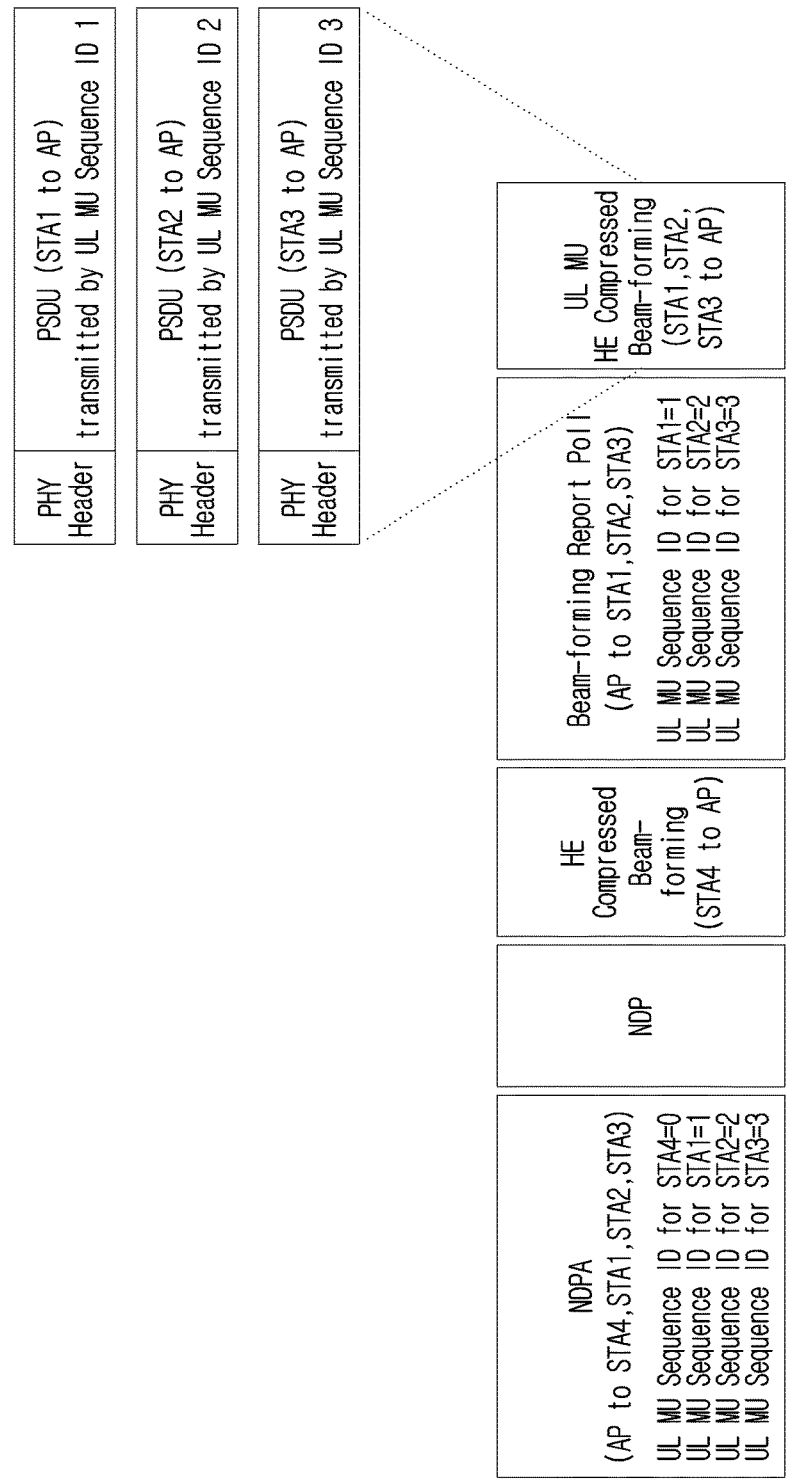

FIGS. 24 and 25 depict UL SU transmission of a feedback frame and UL MU transmission of feedback frames in a sounding procedure according to the present disclosure.

It may not be assumed that all of STAs corresponding to beamformees (i.e., destination STAs of an NDPA frame and an NDP frame) support UL MU transmission. Accordingly, the STAs corresponding to beamformees may be divided into UL MU transmission supported STAs and UL MU transmission non-supported STAs, and a UL transmission scheme may be determined according to the STA classification, for transmission of a frame in response to a feedback trigger frame (e.g., NDPA and NDP frames, or a Beamforming Report Poll frame).

The AP may request transmission of a UL MU transmission-based feedback frame (i.e., a UL MU HE Compressed Beamforming frame) to UL MU transmission supported STAs. That is, the AP may provide feedback trigger information indicating a UL MU transmission-based response type to the UL MU transmission supported STAs. On the other hand, the AP may request transmission of a UL SU transmission-based feedback frame (i.e., a Legacy Compressed Beamforming frame, a UL SU HE Compressed Beamforming frame, or a simple HE Compressed Beamforming frame) to a UL MU transmission non-supported STA(s). That is, the AP may provide feedback trigger information indicating a UL SU transmission-based response type to the UL MU transmission non-supported STA(s).

Feedback frames of different types (i.e., a UL MU transmission type and a UL SU transmission type) may not be transmitted simultaneously. Therefore, a feedback trigger frame (e.g., NDPA and NDP frames, or a Beamforming Report Poll frame) may be provided such that feedback frames of different types may be transmitted at different time points. For example, to receive feedback frames (e.g., a UL MU HE Compressed Beamforming frame and a HE Compressed Beamforming frame) from a plurality of STAs including UL MU transmission supported STAs and a UL MU transmission non-supported STA(s), the AP may transmit information triggering UL MU transmission in an NDPA frame or a Beamforming Report Poll frame sequentially to the UL MU transmission supported STAs and the UL MU transmission non-supported STA(s).

In the examples of FIGS. 24 and 25, it is assumed that STA1, STA2, and STA3 are UL MU transmission supported STAs and STA4 is a UL MU transmission non-supported STA. If the destination STAs of an NDPA frame and an NDP frame include UL MU transmission supported STAs and a UL MU transmission non-supported STA, the NDPA frame may include information triggering UL transmission for one or more STAs supporting one (a first type) of different feedback frame types, and a Beamforming Report Poll frame may include information eliciting UL transmission for one or more STAs supporting the other feedback frame type (a second type). The first type may be a UL MU transmission-based feedback type, and the second type may be a UL SU transmission-based feedback type. Or the first type may be the UL SU transmission-based feedback type, and the second type may be the UL MU transmission-based feedback type.

Further, if the destination STAs of an NDPA frame and an NDP frame include UL MU transmission supported STAs and a UL MU transmission non-supported STA, the NDPA frame and the Beamforming Report Poll frame corresponding to feedback trigger frames may include information indicating a PPDU type to be used as a feedback frame by the STAs corresponding to beamformees, that is, legacy PPDU (or UL SU PPDU) or UL MU PPDU.

In the example of FIG. 24, STA1, STA2, and STA3 supporting UL MU transmission (i.e., supporting the UL MU transmission-based feedback type) are set in the first place (i.e., as the first three STAs) in a STA Info field including a list of STAs corresponding to beamformees in the NDPA frame. In this case, STA1, STA2, and STA3 may transmit UL MU transmission-based feedback frames (i.e., UL MU HE Compressed Beamforming frames) to the AP a predetermined IFS (e.g., an SIFS) after receiving the NDPA frame and the NDP frame. That is, the UL MU transmission supported STAs (i.e., the STAs supporting the UL MU transmission-based response type), STA1, STA2, and STA3 may transmit UL MU HE Compressed Beamforming frames. Since different channel estimation sequences (e.g., different HE-STF and HE-LTF sequences) are used for the plurality of STAs participating in the UL MU transmission, the AP may receive the feedback frames transmitted simultaneously by the plurality of STAs without collision.

In the example of FIG. 24, STA1, STA2, and STA3 supporting UL MU transmission are set in the first place (i.e., as the first three STAs) and STA4 that does not support UL MU transmission (i.e., that supports only the UL SU transmission-based response type) is listed in the following place, in the STA list included in the NDPA frame. In this case, STA4 may transmit a UL SU transmission-based Compressed Beamforming frame (a Legacy Compressed Beamforming frame, a UL SU HE Compressed Beamforming frame, or a simple HE Compressed Beamforming frame) to the AP a predetermined IFS (e.g., an SIFS) after receiving the Beamforming Report Poll frame.

Meanwhile, in the example of FIG. 25, STA4 that does not support UL MU transmission (i.e., that supports only the UL SU transmission-based response type) is set in the first place and STA1, STA2, and STA3 supporting UL MU transmission are listed in the following place, in the STA list included in the NDPA frame. In this case, STA4 may transmit a UL SU transmission-based Compressed Beamforming frame (a Legacy Compressed Beamforming frame, a UL SU HE Compressed Beamforming frame, or a simple HE Compressed Beamforming frame) to the AP a predetermined IFS (e.g., an SIFS) after receiving the NDPA frame and the NDP frame. STA1, STA2, and STA3 may transmit UL MU HE Compressed Beamforming frames to the AP a predetermined IFS (e.g., an SIFS) after receiving the Beamforming Report Poll frame from the AP. That is, the STAs supporting UL MU transmission (i.e., the STAs supporting the UL MU transmission-based response type), STA1, STA2, and STA3 may transmit feedback frames simultaneously in UL MU transmission. Since different channel estimation sequences (e.g., different HE-STF and HE-LTF sequences) are used for the plurality of STAs participating in the UL MU transmission, the AP may receive the feedback frames transmitted simultaneously by the plurality of STAs without collision.

As described above with reference to the examples of FIGS. 24 and 25, the PPDU type of a feedback frame elicited by a feedback trigger frame (an NDPA frame or a Beamforming Report Poll frame) may be the UL SU transmission type (e.g., a legacy PPDU type or a UL SU PPDU type) or the UL MU transmission type (e.g., a UL MU PPDU type), and the type of the feedback frame may be determined based on information (UL transmission triggering information) included in the feedback trigger frame (the NDPA frame or the Beamforming Report Poll frame).

If a feedback frame type for the first STA listed in the STA list included in the NDPA frame is set as the MU type, a STA set to the same feedback frame type as the first STA, that is, the MU type from among one or more STAs following the first STA may transmit a UL MU HE Compressed Beamforming frame a predetermined IFS (e.g., an SIFS) after receiving the NDP frame. Or if the feedback frame type for the first STA listed in the STA list included in the NDPA frame is set as the SU type, only the first STA may transmit a UL SU Compressed Beamforming frame a predetermined IFS (e.g., an SIFS) after receiving the NDP frame.

If an immediate response to the feedback trigger frame (e.g., the NDPA and NDP frames, or the Beamforming Report Poll frame) is of the UL MU transmission type, identification information about different channel estimation sequences (e.g., different HE-STF and HE-LTF sequences) to be used for transmission of UL MU HE Compressed Beamforming frames by the plurality of STAs may be included in the NDPA frame or the Beamforming Report Poll frame corresponding to a feedback trigger frame. The identification information about the channel estimation sequences may be defined as information indicating an element from a set of a plurality of elements corresponding to a plurality of channel estimation sequences (or scrambling codes with which to generate the channel estimation sequences). That is, the identification information about the channel estimation sequences corresponds to information that allocates distinguishable resources (e.g., sequence resources or code resources) to the plurality of STAs for UL MU transmission of the plurality of STAs.

Also, the channel estimation sequence identification information for UL MU transmission may be included as a UL MU Sequence ID field in the NDPA frame or Beamforming Report Poll frame corresponding to a feedback trigger frame. The channel estimation sequence identification information for UL MU transmission (e.g., the UL MU Sequence ID field) may be included in the STA Info field of the NDPA frame or Beamforming Report Poll frame, or in a VHT Control field, a HE Control field, a Service field, etc. Further, the channel estimation sequence identification information for UL MU transmission may be provided as STA-specific control information for each STA.

If the channel estimation sequence identification information for UL MU transmission (e.g., the UL MU Sequence ID field) has a predetermined value (e.g., 0), it may indicate that a feedback frame transmitted a predetermined IFS (e.g., the SIFS) after reception of the feedback trigger frame (e.g., the NDPA and NDP frames, or the Beamforming Report Poll frame) is of the UL MU PPDU type. In this case, one channel estimation sequence (or a scrambling code with which to generate the channel estimation sequence) from the set of the plurality of channel estimation sequences (or the scrambling codes with which to generate the channel estimation sequences) may be determined based on the value of the channel estimation sequence identification information for UL MU transmission (e.g., the UL MU Sequence ID field).

Referring to FIG. 24 again, STA1, STA2, and STA3 supporting UL MU transmission (i.e., the UL MU transmission-based response type) are set in the first place in the STA list included in the NDPA frame and the values of UL MU Sequence ID fields are set to 1, 2, and 3 respectively for STA1, STA2, and STA3. When STA1, STA2, and STA3 transmit the UL MU HE Compressed Beamforming frames to the AP the predetermined IFS (e.g., the SIFS) after receiving the NDPA frame and the NDP frame, STA1, STA2, and STA3 may perform the UL MU transmission using different channel estimation sequences corresponding to the values of the UL MU Sequence ID fields, 1, 2, and 3. STA4 that does not support UL MU transmission (i.e., that supports only the UL SU transmission-based response type) is set in the following place in the STA list included in the NDPA frame and the value of a UL MU Sequence ID field is set to 0 for STA4. In this case, STA4 may transmit the UL SU transmission-based Compressed Beamforming frame (the Legacy Compressed Beamforming frame, the UL SU HE Compressed Beamforming frame, or the simple HE Compressed Beamforming frame) to the AP the predetermined IFS (e.g., the SIFS) after receiving the Beamforming Report Poll frame from the AP.

Referring to FIG. 25 again, STA4 that does not support UL MU transmission (i.e., that supports only the UL SU transmission-based response type) is set in the first place in the STA list included in the NDPA frame and the value of a UL MU Sequence ID field is set to 0 for STA4. STA4 may transmit the UL SU transmission-based Compressed Beamforming frame (the Legacy Compressed Beamforming frame, the UL SU HE Compressed Beamforming frame, or the simple HE Compressed Beamforming frame) to the AP the predetermined IFS (e.g., the SIFS) after receiving the NDPA frame and the NDP frame from the AP. Meanwhile, STA1, STA2, and STA3 supporting UL MU transmission (i.e., the UL MU transmission-based response type) are set in the following place in the STA list included in the NDPA frame and the values of UL MU Sequence ID fields are set to 1, 2, and 3 respectively for STA1, STA2, and STA3. When STA1, STA2, and STA3 transmit the UL MU HE Compressed Beamforming frames to the AP the predetermined IFS (e.g., the SIFS) after receiving the Beamforming Report Poll frame, STA1, STA2, and STA3 may perform the UL MU transmission using different channel estimation sequences corresponding to the values of the UL MU Sequence ID fields, 1, 2, and 3.

Like the afore-described NDPA frame, the Beamforming Report Poll frame transmitted to the plurality of STAs (e.g., STA1, STA2, and STA3) by the AP may include information indicating the type (e.g., the UL MU transmission-based PPDU type) of a UL PPDU corresponding to an immediate response to the Beamforming Report Poll frame and channel estimation sequence identification information (e.g., a UL MU Sequence ID subfield) for UL MU transmission of each participating STA.

Additionally, if STAs supporting UL MU transmission (i.e., STAs supporting the UL MU transmission-based response type) transmit feedback frames simultaneously in a UL MU PPDU to the AP, the transmission times of the feedback frames transmitted by the plurality of STAs may coincide with each other. If the transmission times of the feedback frames transmitted by the plurality of STAs are different, the overhead of processing the feedback frames in the AP increases. To prevent the increase of the overhead, the transmission times of the feedback frames transmitted by the plurality of STAs may be made aligned with each other (e.g., the feedback frames transmitted by the plurality of STAs may be made start at the same time and end at the same time). If the transmission times of the feedback frames transmitted by the plurality of STAs coincide with each other, this may mean that the feedback frames transmitted by the plurality of STAs have the same MCS.

In the example of FIG. 24, the NDPA frame may include MCS information for UL MU transmission so that the feedback frames transmitted by STA1, STA2, and STA3 supporting UL MU transmission (i.e., the UL MU transmission-based response type) may coincide with each other. That is, the plurality of STAs participating in the UL MU transmission may use an MCS value indicated by the MCS information for UL MU transmission, included in the NDPA frame, in transmission of a UL MU PPDU including the feedback frames. Or the MCS information for UL MU transmission (e.g., a UL MU MCS field) may be included in the STA Info field of the NDPA frame or the Beamforming Report Poll frame, or in the VHT Control field, the HE Control field, the Service field, etc. Further, the MCS information for UL MU transmission may be provided as STA-specific control information for each STA, or common control information for the STAs. Or an MCS applied to a UL MU HE Compressed Beamforming frame may be determined based on the MCS value of the NDPA frame.

In the example of FIG. 25, like the NDPA frame illustrated in FIG. 24, the Beamforming Report Poll frame may include MCS information for UL MU transmission so that the transmission times of the feedback frames transmitted by STA1, STA2, and STA3 supporting UL MU transmission (i.e., the UL MU transmission-based response type) may coincide with each other. Or an MCS applied to the UL MU HE Compressed Beamforming frame may be determined based on an MCS value of the Beamforming Report Poll frame.

That is, the MCS applied to the UL MU HE Compressed Beamforming frame may be determined implicitly based on the MCS value of the NDPA frame or the Beamforming Report Poll frame corresponding to a feedback trigger frame, or information indicating the MCS applied to the UL MU HE Compressed Beamforming frame may be included explicitly in the NDPA frame or the Beamforming Report Poll frame corresponding to a feedback trigger frame.

As described before, a frame eliciting UL MU transmission may include information based on which one or more of the type of a UL MU PPDU, resources to be used in the UL MU transmission, a UL MU transmission time, and an MCS of the UL MU transmission are determined. That is, the frame eliciting UL MU transmission may include one or more of information based on which the type of a UL MU PPDU (i.e., the UL MU transmission-based PPDU type or the UL SU transmission-based PPDU type) is determined, information based on which resources (e.g., sequence resources or code resources) to be used in the UL MU transmission are determined, information based on which a UL MU transmission time is determined, and information based on which an MCS of the UL MU transmission is determined.

In addition, when UL MU transmission supported STAs (i.e., STAs supporting the UL MU transmission-based response type) transmit feedback frames simultaneously in a UL MU PPDU, Duration fields included in the respective feedback frames have the same value. The value of a Duration field included in a UL MU HE Compressed Beamforming frame transmitted as an immediate response to an NDPA frame and an NDP frame may be set to a value calculated by subtracting the transmission time of the NDP frame, the transmission time of the UL MU HE Compressed Beamforming frame, and a predetermined IFS (e.g., an SIFS) from the value of a Duration field included in the NDPA frame eliciting the UL MU HE Compressed Beamforming frame. Or the value of the Duration field included in the UL MU HE Compressed Beamforming frame transmitted as an immediate response to the Beamforming Report Poll frame may be set to a value calculated by subtracting the transmission time of the UL MU HE Compressed Beamforming frame and a predetermined IFS (e.g., an SIFS) from the value of a Duration field included in the Beamforming Report Poll frame eliciting the UL MU HE Compressed Beamforming frame.

Now, a description will be given of examples of the present disclosure regarding a configuration of a feedback trigger frame.

NDP frames may be classified into two types. A type 1 NDP frame may be defined as a frame from which an STA receiving the type 1 NDP frame acquires a channel state for OFDM beamforming transmission and DL/UL MU-MIMO-OFDM transmission. A type 2 NDP frame may be defined as a frame from which an STA receiving the type 2 NDP frame acquires a channel state for OFDMA beamforming transmission and DL/UL MU-MIMO-OFDMA transmission. Accordingly, a type 1 Compressed Beamforming response may include channel state information needed to calculate a beamforming steering matrix based on a type 1 NDP, and a type 2 Compressed Beamforming response may include channel state information needed to calculate a beamforming steering matrix based on a type 2 NDP. If the types of an NDP frame and a Compressed Beamforming response are not made clear in the following description, the NDP frame may include a type 1 NDP frame and a type 2 NDP frame, and the Compressed Beamforming response may include a type 1 Compressed Beamforming response and a type 2 Compressed Beamforming response.

UL OFDMA transmission or UL MU-MIMO transmission may be applied to Compressed Beamforming responses (e.g., Compressed Beamforming frames) transmitted in response to a feedback trigger frame (e.g., NDPA and NDP frames, or a Beamforming Report Poll frame) in order to multiplex feedback frames of a plurality of STAs. For UL OFDMA transmission, subchannel allocation information for the plurality of STAs may be included in the feedback trigger frame, and for UL MU-MIMO transmission, spatial stream allocation information for the plurality of STAs may be included in the feedback trigger frame. Further, code resources or sequence resources may be used to multiplex the plurality of STAs. In this case, code resource allocation information or sequence resource allocation information (e.g., channel estimation sequence identification information for UL MU transmission (e.g., a UL MU Sequence ID field), as described in an example of the present disclosure) may be included in the feedback trigger frame.

That is, the feedback trigger frame may include resource allocation information for UL MU transmission of the plurality of STAs. The resource allocation information may include one or more of subchannel allocation information, spatial stream allocation information, code allocation information, and sequence allocation information.

The resource allocation information may be included in an Aggregated-MPDU (A-MPDU) or an MPDU of the feedback trigger frame. For example, an A-MPDU may be configured by combining a frame including the resource allocation information with an NDPA frame, and a PPDU including the A-MPDU may be transmitted to each beamformee. That is, an A-MPDU included in a DL MU PPDU (e.g., an NDPA frame or Beamforming Report Poll frame corresponding to a feedback trigger frame) directed to the plurality of STAs before the UL MU transmission (e.g., transmission of Compressed Beamforming frames) of the plurality of STAs may include a frame carrying resource allocation information for each of the plurality of STAs (i.e., a unicast trigger frame for one of the plurality of STAs).

Or the resource allocation information may be included in an MPDU (e.g., a MAC header or MPDU payload) of the feedback trigger frame and a PPDU including this NDPA frame may be transmitted to the beamformees.

If resource allocation information is transmitted in an A-MPDU of a feedback trigger frame, up to 1 frame including the resource allocation information may be included in the A-MPDU. The frame including the resource allocation information may be the first or last MPDU of the A-MPDU.

If the feedback trigger frame is an NDPA frame, information indicating whether the first feedback report PPDU (e.g., a Compressed Beamforming Frame) for the NDPA frame and an NDP frame is an SU PPDU format or an MU PPDU format may be included in the NDPA frame.

If the first feedback report PPDU format indicated by the NDPA frame is the MU PPDU format, an operation for transmitting a Compressed Beamforming response by a destination STA of the NDPA and NDP frames may vary depending on whether the destination STA has received the MPDU including the resource allocation information after successfully receiving the NDPA frame. For example, if the first feedback report PPDU format is indicated as the MU PPDU format, an STA receiving the MPDU including the resource allocation information may transmit a Compressed Beamforming frame using resources indicated by the received resource allocation information, an SIFS or an NDP transmission time after receiving the NDPA frame. Meanwhile, an STA failing to receive the frame including the resource allocation information may not perform any operation except calculation of information to be included in a Compressed Beamforming Report, even though the first feedback report PPDU format indicated by the NDPA frame is the MU PPDU format.

If the first feedback report PPDU format indicated by the NDPA frame is the SU PPDU format, the first STA indicated by the STA Info field (i.e., the first STA listed in the STA Info field) of the NDPA frame may transmit a Compressed Beamforming frame in SU transmission, an SIFS and an NDP transmission time after receiving the NDPA frame.

If the feedback trigger frame is a Beamforming Report Poll frame, information indicating whether the format of a feedback report PPDU (e.g., a Compressed Beamforming Frame) for the Beamforming Report Poll frame is the SU PPDU format or the MU PPDU format may be included in the Beamforming Report Poll frame.

If the feedback report PPDU format indicated by the Beamforming Report Poll frame is the MU PPDU format, an operation for transmitting a Compressed Beamforming response by an STA receiving the Beamforming Report Poll frame may vary depending on whether the STA has received an MPDU including resource allocation information after successfully receiving the Beamforming Report Poll frame. For example, if the feedback report PPDU format is indicated as the MU PPDU format, an STA receiving the MPDU including the resource allocation information may transmit a Compressed Beamforming frame using resources indicated by the received resource allocation information, an SIFS after receiving the Beamforming Report Poll frame. Meanwhile, an STA failing to receive the frame including the resource allocation information may not perform any operation, even though the feedback report PPDU format indicated by the Beamforming Report Poll frame is the MU PPDU format.

If the feedback report PPDU format indicated by the Beamforming Report Poll frame is the SU PPDU format, an STA indicated by the RA field of the Beamforming Report Poll frame may transmit a Compressed Beamforming frame in SU transmission, an SIFS after receiving the Beamforming Report Poll frame.

Figure 26:
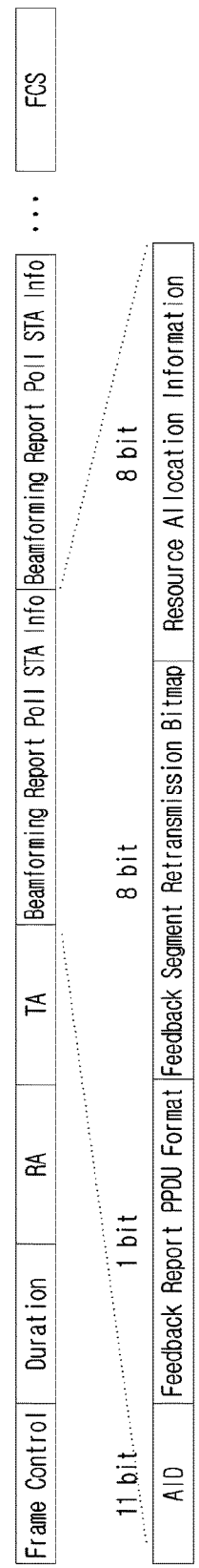
FIG. 26 depicts an exemplary format of a Beamforming Report Poll frame according to the present disclosure.

FIG. 26 depicts an exemplary format of a Beamforming Report Poll frame according to the present disclosure.

The format illustrated in FIG. 26 may be used to indicate resource allocation information in the Beamforming Report Poll frame.

An RA field may be set to a value corresponding to an address of an STA requested to transmit a Compressed Beamforming frame (i.e., a destination STA) in response to the Beamforming Report Poll frame. If the Compressed Beamforming frame is transmitted in UL MU transmission, the RA field may be set to a broadcast address.

A TA field may be set to a value corresponding to an address of an STA transmitting the Beamforming Report Poll frame.

The Beamforming Report Poll frame may include one or more Beamforming Report Poll STA Info fields. Beamforming Report Poll STA Info may include information for multiplexing Compressed Beamforming Responses. For example, one Beamforming Report Poll STA Info field may include an AID subfield, a Feedback Report PPDU Format subfield, a Feedback Segment Retransmission Bitmap subfield, and a Resource Allocation Information subfield.

The AID subfield may be set to a value corresponding to an AID of a beamformee (or 11 Least Significant Bits (LSBs) of the AID of the beamformee) requested to transmit a Compressed Beamforming Report.

The Feedback Report PPDU Format subfield may be set to a value indicating one of the SU PPDU format and the MU PPDU format. If a beamformee requests transmission of a Compressed Beamforming Report in MU transmission (e.g., in OFDMA), the beamformer may set the Feedback Report PPDU Format subfield to a value corresponding to MU (e.g., 1). Or if a beamformee requests transmission of a Compressed Beamforming Report in SU transmission, the beamformer may set the Feedback Report PPDU Format subfield to a value corresponding to SU (e.g., 0).

The Feedback Segment Retransmission Bitmap subfield may be set to a value indicating a feedback segment requested for the Compressed Beamforming Report. If an $n^{th}$ bit position out of 8 bit positions of a feedback segment retransmission bitmap is set to 1, this indicates that a feedback segment having a Remaining Feedback Segments subfield of a (HE) MIMO Control field corresponding to n is requested (if n is 0, this means an LSB and if n is 7, this means a Most Significant Bit (MSB)). Or if the $n^{th}$ bit position is set to 0, this indicates that the feedback segment having the Remaining Feedback Segments subfield of the (HE) MIMO Control field corresponding to n is not requested.

The Resource Allocation Information subfield may be set to a value corresponding to resources to be used for UL MU transmission of the Compressed Beamforming Report. The Resource Allocation Information subfield may include one or more of, for example, subchannel allocation information, spatial stream allocation information, code resource allocation information, and sequence resource allocation information. That is, the Resource Allocation Information subfield may be set to a value indicating a specific subchannel allocated to an STA, a value indicating a specific spatial stream allocated to the STA, a value indicating specific code resources allocated to the STA, or a value indicating specific sequence resources allocated to the STA. Only if the Feedback Report PPDU Format subfield is set to a value corresponding to MU, the Resource Allocation Information subfield may be included in the Beamforming Report Poll STA Info field. If the Feedback Report PPDU Format subfield is set to a value corresponding to SU, the Resource Allocation Information subfield may not be included in the Beamforming Report Poll STA Info field.

Figure 27:
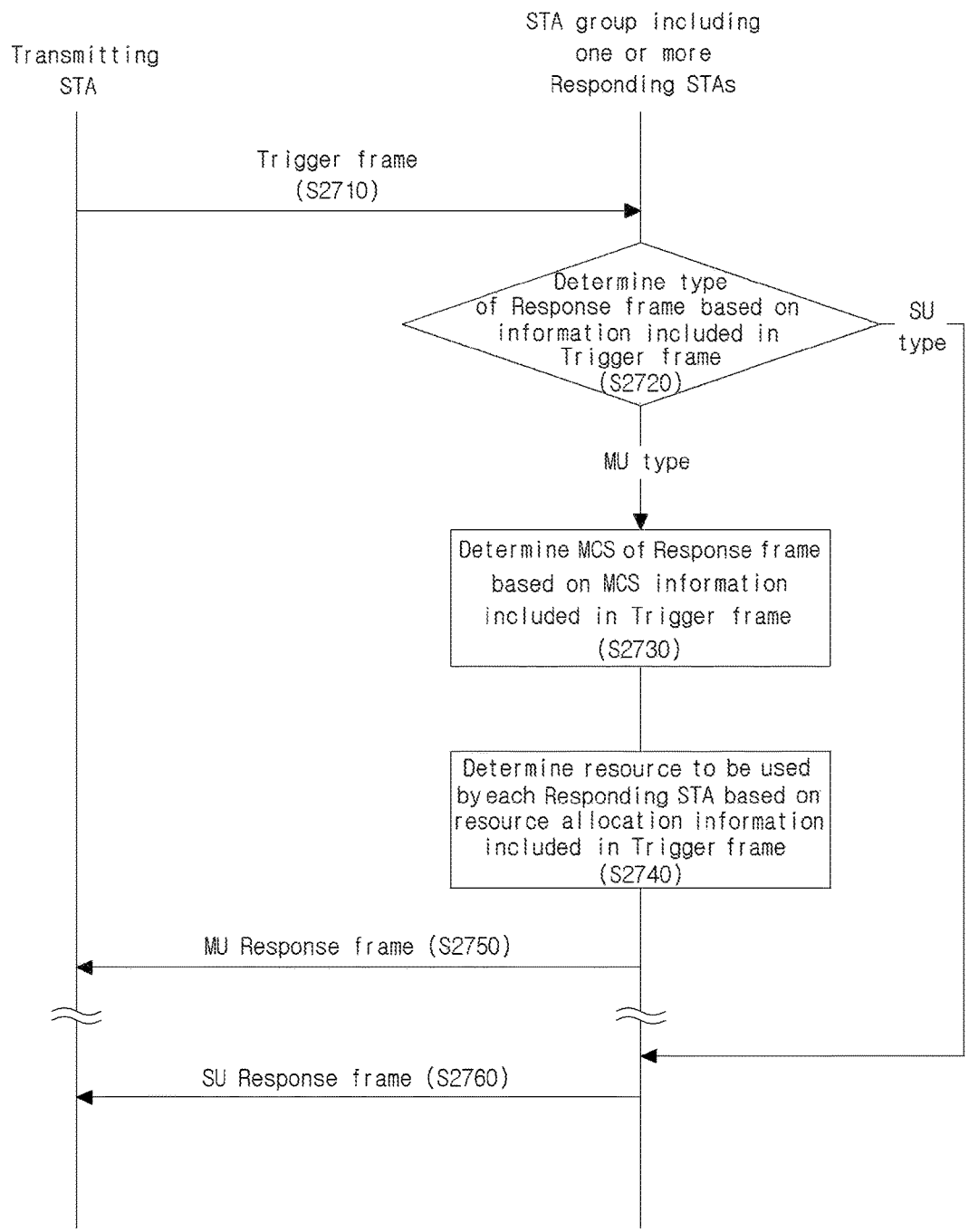
FIG. 27 depicts an exemplary method according to the present disclosure.

FIG. 27 depicts an exemplary method according to the present disclosure.

In step S2710, a transmitting STA (e.g., an AP corresponding to a beamformer) may transmit a trigger frame to an STA group including one or more responding STAs (e.g., STAs corresponding to beamformees). The trigger frame may include an NDPA frame or Beamforming Report Poll frame corresponding to a feedback trigger frame described in the forgoing examples. The trigger frame may include information about transmission of a response frame in response to the trigger frame. The response frame may include a (HE) Compressed Beamforming frame (i.e., a frame including a beamforming report) corresponding to a feedback frame described in the foregoing examples. The information about transmission of a response frame may include information about the type of a response frame (i.e., the SU type or the MU type), information about an MCS of the response frame, and resource allocation information for one or more STAs transmitting response frames.

In step S2720, each of responding STAs belonging to the STA group may determine the type of a response frame elicited by the trigger frame based on the information included in the received trigger frame (e.g., the information about the type of a response frame). If the type of a response frame is determined to be the MU type, the responding STA may determine an MCA value to be applied to the response frame based on the MCS information included in the trigger frame in step S2730. For example, the MCS of the response frame may be determined implicitly based on an MCS of the trigger frame or determined according to the MCS information about the response frame, included in the trigger frame. In step S2740, the responding STA may determine resources (e.g., a subchannel, a resource unit, a spatial stream, a code, a sequence, etc.) to be used for transmission of the response frame based on the resource allocation information included in the trigger frame. Accordingly, the plurality of responding STAs may transmit MU response frames simultaneously to the transmitting STA in step S2750.

If the type of the response frame is determined to be the SU type in step S2720, one responding STA may transmit an SU response frame to the transmitting STA in step S2760.

Figure 28:
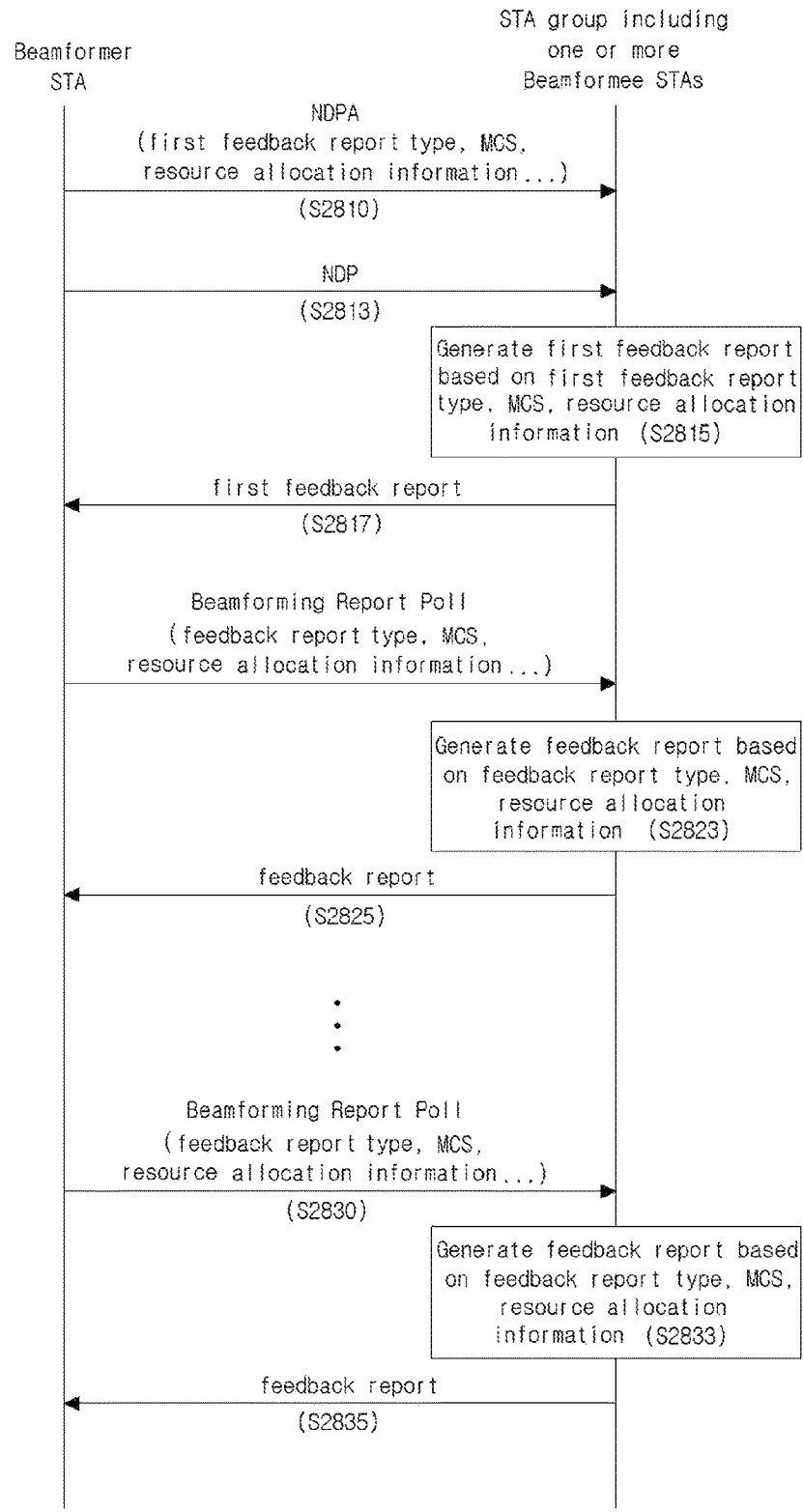
FIG. 28 depicts another exemplary method according to the present disclosure.

FIG. 28 depicts another exemplary method according to the present disclosure.

FIG. 28 illustrates a specific example including the exemplary method according to the present disclosure, illustrated in FIG. 27.

In step S2810, a beamformer STA (e.g., an AP) may transmit an NDPA frame to an STA group including one or more beamformee STAs (hereinafter, referred to as a beamformee STA group). The NDPA frame may include information about a type of a first feedback report, MCS information about the first feedback report, and resource allocation information for the first feedback report. The information about the first feedback report may indicate the UL MU transmission type or the UL SU transmission type. Step S2810 of FIG. 28 may correspond to step S2710 of FIG. 27.

In step S2813, the beamformer STA may transmit an NDP frame to the beamformee STA group.

In step S2815, one or more STAs (e.g., one or more STAs to which resources for UL transmission have been allocated by the resource allocation information included in the NDPA frame) may generate first feedback reports based on the information included in the NDPA frame (i.e., the type, MCS, and resource allocation information of the first feedback reports). Specifically, the one or more STAs may determine the type of the first feedback reports and generate the first feedback reports in the UL SU type or the UL MU type. Step 2815 of FIG. 28 may correspond to step S2720 of FIG. 27 or steps S2720, S2730, and S2740 of FIG. 27.

In step S2817, the one or more STAs may transmit the first feedback reports (e.g., Compressed Beamforming frames) to the beamformer STA. Step S2817 of FIG. 28 may correspond to step S2750 or S2760 of FIG. 27.

If there is any remaining STA except for the STAs that have transmitted the first feedback reports in the beamformer STA group, the beamformer STA may transmit a Beamforming Report Poll frame to one or more of the remaining STAs in step S2820. The Beamforming Report Poll frame may include information about the type of feedback reports to be transmitted by the one or more STAs, MCS information about the feedback reports, and resource allocation information for the feedback reports. The information about the feedback reports may indicate one of the UL MU transmission type and the UL SU transmission type. Step S2820 of FIG. 28 may correspond to step S2710 of FIG. 27.

In step S2823, the one or more STAs may generate the feedback reports based on the information included in the Beamforming Report Poll frame received in step S2820 (i.e., the type, MCS, and resource allocation information of the feedback reports). Specifically, the one or more STAs determine the type of the feedback reports and generate the feedback reports in the UL SU type or the UL MU type. Step 2823 of FIG. 28 may correspond to step S2720 of FIG. 27 or steps S2720, S2730, and S2740 of FIG. 27.

In step S2825, the one or more STAs may transmit the feedback reports (e.g., Compressed Beamforming frames) to the beamformer STA. Step S2825 of FIG. 28 may correspond to step S2750 or S2760 of FIG. 27.

Subsequently, if there is any remaining STA except for the STAs that have transmitted the first feedback reports (S2817) and the STAs that have transmitted the additional feedback reports (S2825) in the beamformer STA group, a step for transmitting a Beamforming Report Poll frame to one or more of the remaining STAs by the beamformer STA, and thus generating feedback reports and transmitting the feedback reports to the beamformer STA by the one or more STAs may further be performed. This corresponds to performing the afore-described steps S2820, S2823, and S2825 for the one or more additional STAs. This step may be additionally performed until all STAs of the beamformee STA group transmit feedback reports to the beamformer STA. Finally, the beamformer STA may transmit a Beamforming Report Poll frame in step S2830, and thus one or more STAs generate feedback reports in step S2833 and transmit the feedback reports in step S2835. Thus, the exemplary NDP sounding procedure according to the present disclosure may be completed.

While the afore-described exemplary methods of present disclosure have been described as a series of operations for simplicity of description, this does not limit the sequence of steps. When needed, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the afore-described exemplary methods of present disclosure.

The present disclosure includes an apparatus for processing or performing the method of the present disclosure (e.g., the wireless device and its components described with reference to FIGS. 1, 2, and 3).

The present disclosure includes software (an operating system (OS), an application, firmware, a program, etc.) for executing the method of the present disclosure in a device or a computer, and a medium storing the software that can be executed in a device or a computer.

While various embodiments of the present disclosure have been described in the context of an IEEE 802.11 system, they are applicable to various mobile communication systems.

What is claimed is:

1. A method of transmitting a response frame by a responding station to a transmitting station in a wireless local area network, the method comprising:
   receiving, by the responding station, from the transmitting station, a trigger frame indicating a type of feedback requested, the trigger frame including information related to a modulation and coding scheme (MC S) for a response frame; and
   transmitting, by the responding station, to the transmitting station, the response frame according to an MCS determined based on the information related to the MCS for the response frame included in the trigger frame, the response frame including a first compressed beamforming frame according to the type of feedback requested,
   wherein, when the type of feedback requested corresponds to a multiple-user (MU) type, the first compressed beamforming frame is simultaneously transmitted with multiple compressed beamforming frames from a plurality of stations.

2. The method of claim 1, wherein the information related to the MCS for the response frame corresponds to an MCS of the trigger frame.

3. The method of claim 1, wherein the information related to the MCS for the response frame is provided as common information for the plurality of stations.

4. The method of claim 1, wherein the information related to the MCS for the response frame is provided as station-specific information for each of the plurality of stations.

5. The method of claim 1, wherein the type of feedback requested includes a single-user (SU) type and the MU type.

6. The method of claim 5, wherein the responding station transmits the response frame having a type determined based on the type of feedback requested.

7. The method of claim 5, wherein, when the type of feedback requested corresponds to the SU type, the response frame is transmitted only by the responding station.

8. The method of claim 1, wherein the trigger frame further includes resource allocation information for each of the plurality of stations.

9. The method of claim 8, wherein the resource allocation information includes information indicating distinguished resources for the plurality of stations.

10. The method of claim 8, wherein the resource allocation information includes subchannel allocation information for each of the plurality of stations.

11. The method of claim 8, wherein the resource allocation information is included in an Aggregated-Medium Access Control Protocol Data Unit (A-MPDU) of the trigger frame.

12. The method of claim 8, wherein the resource allocation information is included in an MPDU of the trigger frame.

13. The method of claim 1, wherein the trigger frame includes a beamforming report poll frame, and wherein the compressed beamforming frame is transmitted as an immediate response to the beamforming report poll frame.

14. The method of claim 1, further comprising:
   receiving, from the transmitting station, a null data packet announcement (NDPA) frame; and
   receiving, from the transmitting station, a null data packet (NDP) frame after receiving the NDPA frame,
   wherein the compressed beamforming frame is transmitted by the responding station after the responding station receives the NDPA frame and the NDP frame.

15. The method of claim 14, wherein the trigger frame is received by the responding station after receiving the NDP frame.

16. The method of claim 14, wherein the plurality of stations corresponding to first plurality of station information fields included in the NDPA frame simultaneously transmits the compressed beamforming frame.

17. A method of receiving a response frame by a transmitting station from a responding station in a wireless local area network, the method comprising:
   transmitting, by the transmitting station, to the responding station, a trigger frame indicating a type of feedback requested, the trigger frame including information related to a modulation and coding scheme (MCS) for a response frame; and
   receiving, by the transmitting station, from the responding station, the response frame according to an MCS determined based on the information related to the MCS for the response frame included in the trigger frame, the response frame including a first compressed beamforming frame according to the type of feedback requested,
   wherein, when the type of feedback requested corresponds to a multiple-user (MU) type, the first compressed beamforming frame is simultaneously received with multiple compressed beamforming frames from a plurality of stations.

18. The method of claim 17, further comprising:
transmitting, by the transmitting station, to the responding station, a null data packet announcement (NDPA) frame; and
transmitting, by the transmitting station, to the responding station, a null data packet (NDP) frame after transmitting the NDPA frame,
wherein the compressed beamforming frame is received from the responding station after the transmitting station transmits the NDPA frame and the NDP frame.

19. The method of claim 18, wherein the trigger frame is transmitted by the transmitting station after transmitting the NDP frame.

20. The method of claim 17, wherein the trigger frame includes a beamforming report poll frame, and wherein the compressed beamforming frame is received as an immediate response to the beamforming report poll frame.

* * * * *